(12) United States Patent
Yadav et al.

(10) Patent No.: US 12,292,799 B2
(45) Date of Patent: May 6, 2025

(54) SHARED WORKLOAD ANOMALY DETECTION ACROSS MULTIPLE HOSTS BASED ON BARE-METAL RECOVERY AND SYSTEM-STATE RECOVERY DATA AND METADATA

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 17/726,982

(22) Filed: Apr. 22, 2022

(65) Prior Publication Data
US 2023/0342255 A1    Oct. 26, 2023

(51) Int. Cl.
*G06F 11/00*    (2006.01)
*G06F 11/14*    (2006.01)

(52) U.S. Cl.
CPC ...... *G06F 11/1435* (2013.01); *G06F 2201/84* (2013.01)

(58) Field of Classification Search
CPC ............ G06F 11/1435; G06F 2201/84; G06F 16/215; G06F 16/20; G06F 11/0793; G06F 11/0781; G06F 11/079; G06F 17/16
See application file for complete search history.

(56) References Cited

U.S. PATENT DOCUMENTS

| | | | |
|---|---|---|---|
| 6,484,190 B1 | 11/2002 | Cordes et al. | |
| 8,326,861 B1 | 12/2012 | Ainslie et al. | |
| 8,495,037 B1 | 7/2013 | Westenberg | |
| 10,108,497 B1 | 10/2018 | Chockalingam et al. | |
| 10,146,629 B1 | 12/2018 | Yadav et al. | |
| 10,838,912 B1 | 11/2020 | Chopra et al. | |
| 11,461,034 B2* | 10/2022 | Abdul Rasheed | H04L 63/10 |
| 11,782,804 B1* | 10/2023 | Yadav | G06F 11/1469 707/649 |
| 11,930,039 B1* | 3/2024 | Geethakumar | G06F 18/2433 |

(Continued)

*Primary Examiner* — Loan L. T. Truong
(74) *Attorney, Agent, or Firm* — Chamberlain, Hrdlicka, White, Williams & Aughtry; Aly Z. Dossa

(57) ABSTRACT

A method and system for shared workload anomaly detection across multiple hosts based on bare-metal recovery and/or system-state recovery data and metadata. Since at least said bare-metal recovery and/or system-state recovery metadata has information about each workload operating on one or many host(s), comparing said metadata across any set of hosts could provide the pattern of data being generated there-across. Further, other metadata generated by any shared workload instance(s), operating on a set of hosts, should be consistent across the set of hosts. Should a shared workload instance on one or more hosts generate metadata not sync with metadata generated from a baseline shared workload instance, such discrepancies could be a sign of unwanted anomalies that may warrant further analyses, alerts, etc. Embodiments disclosed herein, accordingly, propose comparing metadata from non-baseline shared workload instances against metadata from the baseline shared workload instance, in order to detect and/or resolve anomalies concerning shared workload instance behavior and/or functionality.

20 Claims, 23 Drawing Sheets

(56) References Cited

U.S. PATENT DOCUMENTS

| | | | |
|---|---|---|---|
| 11,947,939 B1* | 4/2024 | Longmore | G06F 8/433 |
| 2006/0053332 A1 | 3/2006 | Uhlmann et al. | |
| 2007/0289019 A1* | 12/2007 | Lowrey | G06F 21/554 |
| | | | 726/24 |
| 2008/0047013 A1 | 2/2008 | Claudatos et al. | |
| 2012/0330954 A1* | 12/2012 | Sivasubramanian | |
| | | | G06F 16/217 |
| | | | 707/E17.089 |
| 2015/0106344 A1 | 4/2015 | Wagner | |
| 2016/0110267 A1 | 4/2016 | Earl et al. | |
| 2017/0024232 A1 | 1/2017 | Barve et al. | |
| 2017/0060699 A1 | 3/2017 | Hohl et al. | |
| 2017/0286484 A1 | 10/2017 | Fan et al. | |
| 2017/0317905 A1* | 11/2017 | Schimmelpfeng | |
| | | | H04L 43/0817 |
| 2017/0332256 A1* | 11/2017 | Gupta | H04L 43/08 |
| 2018/0095816 A1 | 4/2018 | Fang et al. | |
| 2018/0330088 A1 | 11/2018 | Crofton et al. | |
| 2019/0042744 A1 | 2/2019 | Rajasekharan et al. | |
| 2019/0245733 A1 | 8/2019 | Zhang et al. | |
| 2019/0377877 A1* | 12/2019 | Johns | H04L 63/1441 |
| 2020/0192589 A1* | 6/2020 | Mehta | G06F 3/0653 |
| 2020/0285546 A1* | 9/2020 | Kraplanee | G06F 21/6245 |
| 2020/0301883 A1 | 9/2020 | Kamiya et al. | |
| 2021/0044604 A1* | 2/2021 | Annen | G06F 21/565 |
| 2021/0182161 A1* | 6/2021 | Degaonkar | G06F 3/0631 |
| 2021/0319105 A1* | 10/2021 | Whitmore | G06F 21/565 |
| 2022/0043719 A1 | 2/2022 | Chopra et al. | |
| 2022/0058094 A1* | 2/2022 | Gunturu | G06F 11/1464 |
| 2022/0237091 A1* | 7/2022 | Nuthakki | G06F 11/3409 |
| 2022/0398170 A1 | 12/2022 | Yadav et al. | |
| 2023/0018068 A1* | 1/2023 | Rao | H04L 63/1425 |
| 2023/0095814 A1 | 3/2023 | Sarkar | |
| 2023/0124166 A1* | 4/2023 | Mohanty | G06N 20/20 |
| | | | 726/22 |
| 2023/0297477 A1* | 9/2023 | Yadav | G06F 11/1451 |
| | | | 714/15 |
| 2023/0333903 A1* | 10/2023 | White | G06F 9/505 |
| 2023/0342254 A1* | 10/2023 | Yadav | G06F 11/1469 |
| 2023/0376301 A1* | 11/2023 | Wang | G06F 8/656 |

* cited by examiner

SHARED WORKLOAD ANOMALY DETECTION ACROSS MULTIPLE HOSTS BASED ON BARE-METAL RECOVERY AND SYSTEM-STATE RECOVERY DATA AND METADATA

BACKGROUND

A bare-metal recovery operation may entail the restoration of a whole computing system, including any workload instance(s), their respective state (e.g., configuration and/or operational parameters) at a given point-in-time, and any granularity of their respective data and/or metadata maintained at the given point-in-time, which had collectively resided on said computing system (often prior to a failover event). Further, said entirety of a computing system may be backed-up on one or many backup target(s) in a form that enables said entirety of the computing system to be restored on any bare-metal computing system (i.e., any computing system lacking installed workload(s) thereon yet).

SUMMARY

In general, in one aspect, the invention relates to a method for shared workload anomaly detection across multiple volume hosts. The method includes identifying a shared workload operating across a set of volume hosts; selecting, from the set of volume hosts, a volume host to serve as a baseline volume host; obtaining, for the baseline volume host, baseline file-system object metadata descriptive of a collection of file-system objects; selecting, from the set of volume hosts, a second volume host to serve as a non-baseline volume host; obtaining, for the non-baseline volume host, non-baseline file-system object metadata descriptive of a second collection of file-system objects; performing an assessment of the non-baseline file-system object metadata against the baseline file-system object metadata to produce a metadata anomaly result; and performing, based on the metadata anomaly result, an anomaly-driven action concerning the non-baseline volume host.

In general, in one aspect, the invention relates to a non-transitory computer readable medium (CRM). The non-transitory CRM includes computer readable program code, which when executed by a computer processor, enables the computer processor to perform a method for shared workload anomaly detection across multiple volume hosts. The method includes identifying a shared workload operating across a set of volume hosts; selecting, from the set of volume hosts, a volume host to serve as a baseline volume host; obtaining, for the baseline volume host, baseline file-system object metadata descriptive of a collection of file-system objects; selecting, from the set of volume hosts, a second volume host to serve as a non-baseline volume host; obtaining, for the non-baseline volume host, non-baseline file-system object metadata descriptive of a second collection of file-system objects; performing an assessment of the non-baseline file-system object metadata against the baseline file-system object metadata to produce a metadata anomaly result; and performing, based on the metadata anomaly result, an anomaly-driven action concerning the non-baseline volume host.

In general, in one aspect, the invention relates to a system. The system includes a set of volume hosts; and an admin device operatively connected to the set of volume hosts and including a computer processor programmed to perform a method for shared workload anomaly detection across multiple volume hosts. The method includes identifying a shared workload operating across the set of volume hosts; selecting, from the set of volume hosts, a volume host to serve as a baseline volume host; obtaining, for the baseline volume host, baseline file-system object metadata descriptive of a collection of file-system objects; selecting, from the set of volume hosts, a second volume host to serve as a non-baseline volume host; obtaining, for the non-baseline volume host, non-baseline file-system object metadata descriptive of a second collection of file-system objects; performing an assessment of the non-baseline file-system object metadata against the baseline file-system object metadata to produce a metadata anomaly result; and performing, based on the metadata anomaly result, an anomaly-driven action concerning the non-baseline volume host.

Other aspects of the invention will be apparent from the following description and the appended claims.

DETAILED DESCRIPTION

Figure 1A:
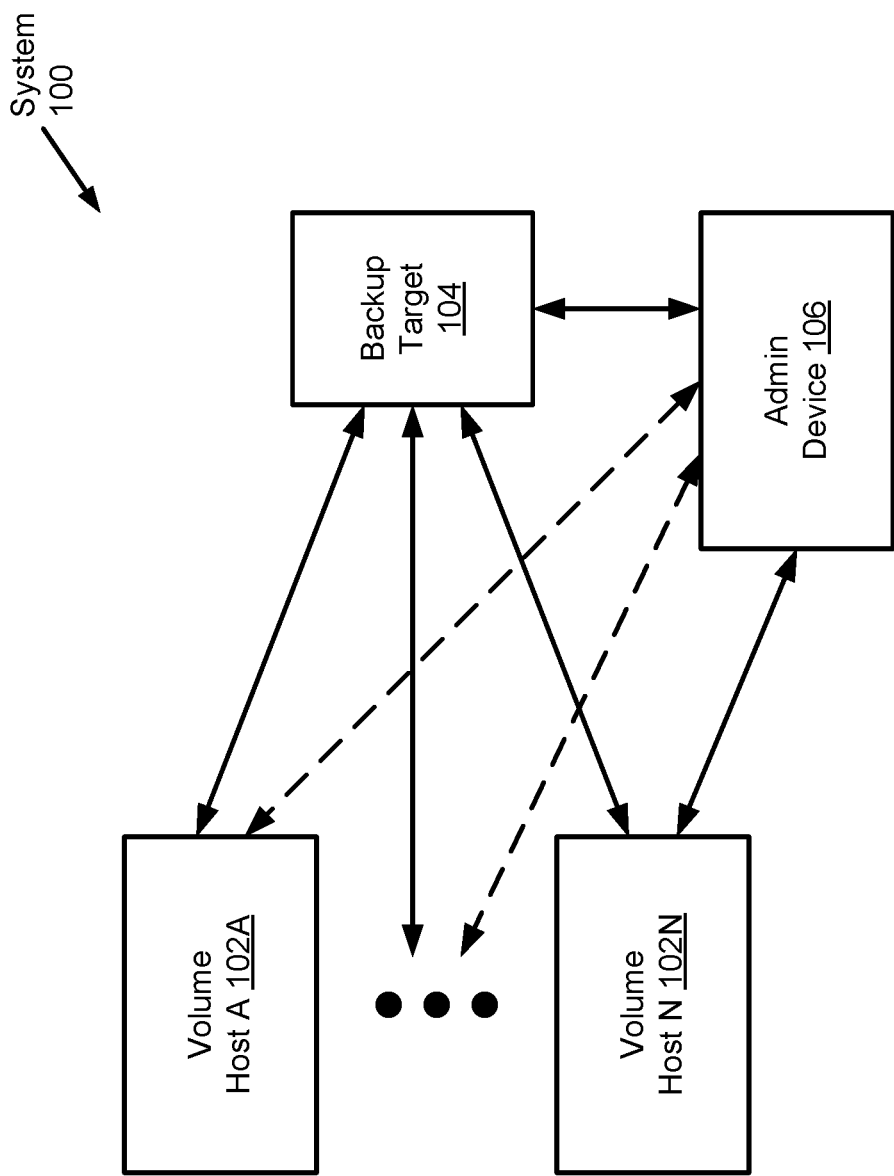
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout the application, the term workload may be used interchangeably with the term volume shadow copy service (VS S) writer. A workload or VSS writer may refer to any computer program, operating or executing on a host (e.g., volume host), that may include functionality to read, write, or otherwise access, data and/or metadata on one or many storage device(s) (e.g., volume(s)) residing on, or operatively connected (i.e., directly or indirectly connected) to, the host. Examples of a workload or VSS writer may include, but may not be limited to, a software application, an operating system, a utility, a service, etc.

In general, embodiments of the invention relate to shared workload anomaly detection across multiple hosts based on bare-metal recovery and/or system-state recovery data and metadata. Since at least said bare-metal recovery and/or system-state recovery metadata has information about each workload operating on one or many host(s), comparing said metadata across any set of hosts could provide the pattern of data being generated there-across. Further, other metadata generated by any shared workload instance(s), operating on a set of hosts, should be consistent across the set of hosts. Should a shared workload instance on one or more hosts generate metadata not sync with metadata generated from a baseline shared workload instance, such discrepancies could be a sign of unwanted anomalies that may warrant further analyses, alerts, etc. Embodiments disclosed herein, accordingly, propose comparing metadata from non-baseline shared workload instances against metadata from the baseline shared workload instance, in order to detect and/or resolve anomalies concerning shared workload instance behavior and/or functionality.

FIG. 1A shows a system in accordance with one or more embodiments of the invention. The system (100) may include one or many volume host(s) (102A-102N), a backup target (104), and an admin device (106). Each of these system (100) components is described below.

In one or many embodiment(s) of the invention, a volume host (102A-102N) may represent any physical appliance or computing system designed and configured to receive, generate, process, store, and/or transmit data, as well as to provide an environment in which one or many computer program(s) may execute thereon. The computer program(s) may, for example, implement large-scale and complex data processing; or implement one or more services offered locally or over a network (not shown). Further, in providing an execution environment for any computer program(s) installed thereon, a volume host (102A-102N) may include and allocate various resources (e.g., computer processors, memory, storage, virtualization, network bandwidth, etc.), as needed, to the computer program(s) and/or the tasks (or processes) instantiated thereby. One of ordinary skill will appreciate that a volume host (102A-102N) may perform other functionalities without departing from the scope of the invention. Examples of a volume host (102A-102N) may include, but may not be limited to, a desktop computer, a laptop computer, a network server, a network mainframe, a smartphone, a tablet computer, or any other computing system similar to the exemplary computing system shown in FIG. 7. Moreover, any volume host (102A-102N) is illustrated and described in further detail with respect to FIG. 1B, below.

In one or many embodiment(s) of the invention, the backup target (104) may represent any data backup, archiving, and/or disaster recovery storage system. The backup target (104) may be implemented using one or more storage servers (and/or one or more computing systems similar to the exemplary computing system shown in FIG. 7) (not shown)—each of which may include one or many storage device(s) for storing data. Further, the backup target (104) may, at least in part, include persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, the backup target (104) is illustrated and described in further detail with respect to FIG. 1C, below.

In one or many embodiment(s) of the invention, the admin device (106) may represent any physical appliance or computing system operated by one or many administrator(s) of the system (100). An administrator may refer to an individual or entity whom may be responsible for overseeing system (100) operations and maintenance. To that end, at least as it pertains to embodiments disclosed herein, the admin device (106) may include functionality to enable an administrator to: implement workload anomaly detection for standalone hosts based on bare-metal recovery and system-state recovery data and metadata; generate a topological view of organization information technology environments based on bare-metal recovery and system-state recovery data and metadata; and implement shared workload anomaly detection across multiple hosts based on bare-metal recovery and system-state recovery data. These functionalities are illustrated and described in further detail with respect to FIGS. 4A-4C, 5A-5B, and 6A-6C, respectively, below. Furthermore, one of ordinary skill will appreciate that the admin device (106) may perform other functionalities without departing from the scope of the invention.

In one or many embodiment(s) of the invention, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the invention. For example, in one or many embodiment(s) of the invention, the system (100) may further include a second or more backup target(s) (not shown) each operatively connected to the volume host(s) (102A-102N) and the admin device (106).

Figure 1B:
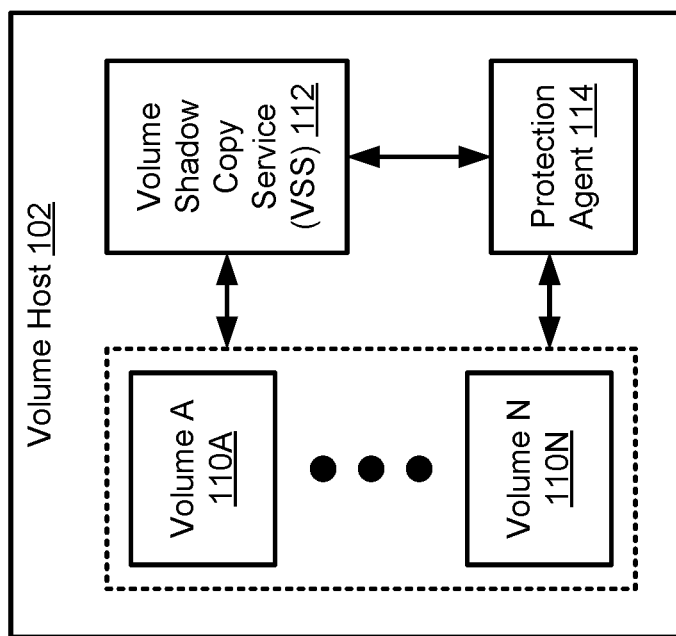
FIG. 1B shows a volume host in accordance with one or more embodiments of the invention.

FIG. 1B shows a volume host in accordance with one or more embodiments of the invention. The volume host (102) (introduced above) (see e.g., FIG. 1A) may include one or many volume(s) (110A-110N), a volume shadow copy service (VSS) (112), and a protection agent (114). Each of these volume host (102) subcomponents is described below.

In one or many embodiment(s) of the invention, a volume (110A-110N) may refer to a database, or any logical container, to and from which data (and/or metadata thereof), which has been received by or generated on the volume host (102) may be stored and retrieved. By way of examples, the aforementioned data (and/or metadata) that may be maintained on the volume(s) (110A-110N) (or any portion thereof) may include workload and/or user data pertinent to one or many workload(s) (not shown) (e.g., software application(s), operating system(s), utility (utilities), service(s), etc.) that may be operating on the volume host (102). Further, a volume (110A-110N) may occupy any portion of persistent storage (not shown) available on the volume host (102). Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) of the invention, the VSS (112) may refer to a computer program that may execute on the underlying hardware of the volume host (102), which may be responsible for coordinating the creation of consistent shadow copies (also referred to as VSS snapshots) of the volume(s) (110A-110N) (or any portion(s) thereof) targeted for backup. To that end, the VSS (112) may include functionality to: coordinate with the protection agent (114) (e.g., a VSS requestor (described below)), any number of VSS writers (not shown) (e.g., workload(s)), and any number of VSS providers (not shown) to create the consistent shadow copies. Metadata produced as a result of consistent shadow copy creation, alongside any created consistent shadow copies, may be provided to the protection agent (114) in support of embodiments disclosed herein. One of ordinary skill, however, will appreciate that the VSS (112) may perform other functionalities without departing from the scope of the invention.

In one or many embodiment(s) of the invention, concerning the creation of consistent shadow copies: (a) a VSS requestor may refer to an entity (e.g., the protection agent (114)) that submits, to the VSS (112), requests for the creation of consistent shadow copies; (b) a VSS writer may refer to an entity (e.g., a workload or any subcomponent thereof) that stores or writes data onto the volume(s) (110A-110N); and (c) a VSS provider may refer to an entity (e.g., an operating system component or a dedicated hardware component) that manages the volume(s) (110A-110N) and produces the consistent shadow copies. One of ordinary skill will appreciate that a VSS requestor, a VSS writer, and/or a VSS provider may perform other functionalities without departing from the scope of the invention.

In one or many embodiment(s) of the invention, any consistent shadow copy may be created using any existing procedure—a non-limiting example of which is outlined below.

Example Consistent Shadow Copy Creation Procedure

1. VSS requestor requests VSS to create consistent shadow copy of target volume(s) or target data set(s)
2. VSS notifies VSS writer(s) to prepare their data for making the consistent shadow copy; each VSS writer creates a description of the backup components and defines a restoration method; each VSS writer prepares their data by completing any open input-output (TO) transactions, rolling transaction logs, and flushing caches
3. VSS directs VSS writer(s) to temporarily freeze IO write requests to their respective volume(s) or data set(s) for the duration of consistent shadow copy creation
4. VSS flushes the file-system buffer(s) and then freezes the file-system(s), thereby ensuring that file-system metadata is copied and that the target volume(s) or target data set(s) is/are copied in a consistent order
5. VSS notifies VSS provider(s) to create and maintain the consistent shadow copy of the target volume(s) or target data set(s) (for full backup operations), or of change(s) within the target volume(s) or target data set(s) (for incremental backup operations)
6. Once the consistent shadow copy is successfully created, VSS unfreezes the file-system(s) and instructs the VSS writer(s) to unfreeze IO write requests to their respective volume(s) or data set(s)
7. VSS subsequently provides location information (i.e., where the consistent shadow copy is being maintained) to the VSS requestor In one or many embodiment(s) of the invention, the protection agent (114) may refer to a computer program that may execute on the underlying hardware of the volume host (102), which may be responsible for facilitating backup and recovery operations targeting the volume(s) (110A-110N) (or any portion(s) thereof). To that end, the protection agent (114) may protect the volume(s) (110A-110N) (or any portion(s) thereof) against data loss (i.e., by backing up one or many targeted file-system object(s)); and restore the volume(s) (110A-110N) (or any portion(s) thereof) following said data loss (i.e., by recovering one or many targeted file-system object(s)). The aforementioned functionalities, at least pertinent to data backup operations, are illustrated and described in further detail with respect to FIGS. 3A-3E, below. Furthermore, one of ordinary skill will appreciate that the protection agent (114) may perform other functionalities without departing from the scope of the invention.

While FIG. 1B shows a configuration of components and/or subcomponents, other volume host (102) configurations may be used without departing from the scope of the invention.

Figure 1C:
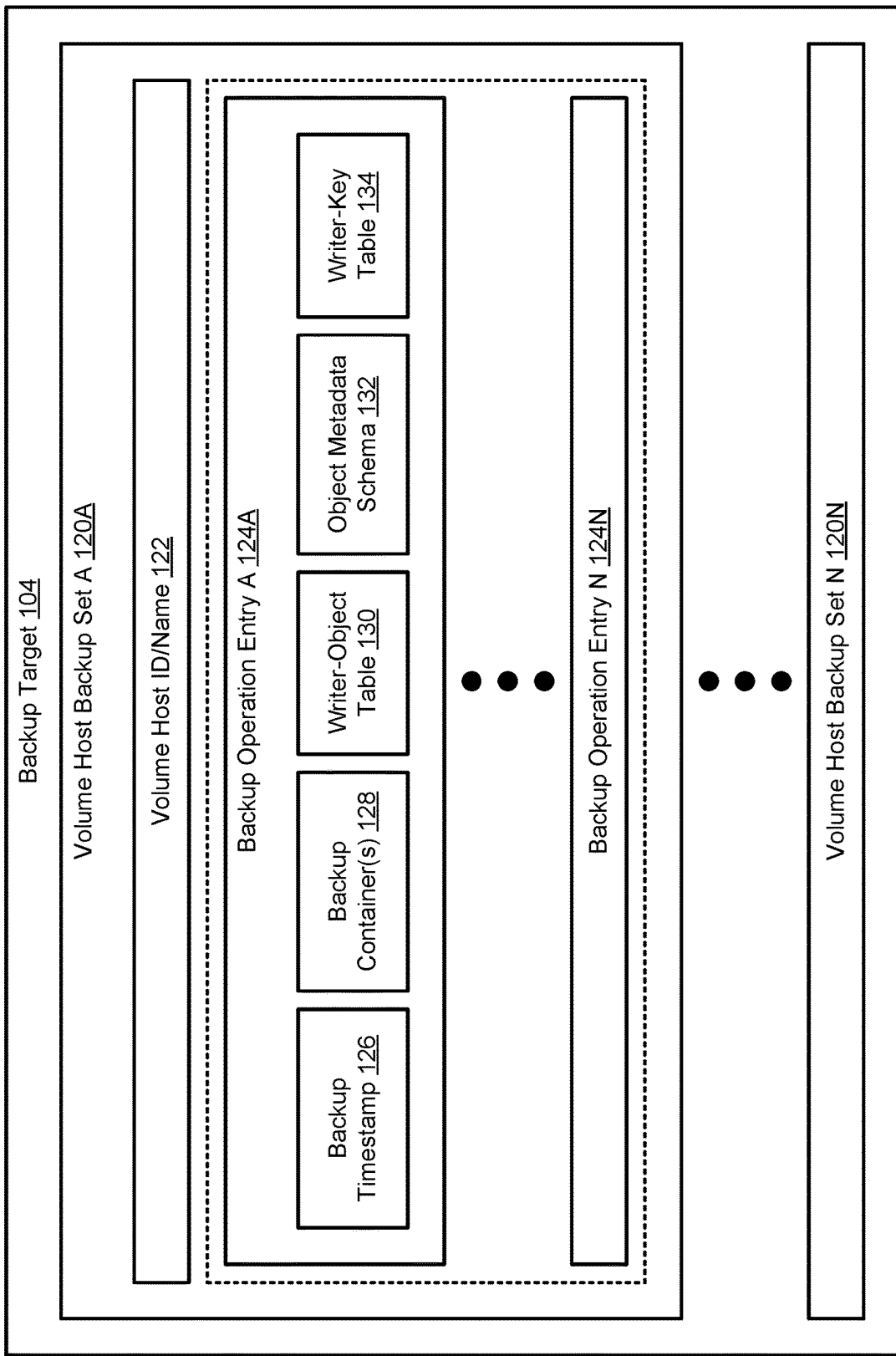
FIG. 1C shows a backup target in accordance with one or more embodiments of the invention.

FIG. 1C shows a backup target in accordance with one or more embodiments of the invention. The backup target (104) (introduced above) (see e.g., FIG. 1A) may include one or many storage device(s) (not shown) across which one or many volume host backup set(s) (120A-120N) may be maintained. A volume host backup set (120A-102N) may refer to a data structure or logical container within which one or many file-system object(s) (e.g., file(s) and/or directory (directories)) (and/or metadata thereof) pertinent to, and across one or many backup operation(s) (and/or metadata thereof) originating from, a given volume host (not shown) may be stored, in whole or in part, and temporarily or permanently. That is, a cardinality (or number) of volume host backup set(s) (120A-120N), maintained on the backup target (104), may match a cardinality (or number) of volume host(s) (not shown) in a system (see e.g., FIG. 1A).

In one or many embodiment(s) of the invention, a volume host backup set (120A-120N) may include a volume host identifier or name (122) and a collection of backup operation entries (124A-124N). The volume host identifier/name (122) may refer to a character string (e.g., a series of characters including letters, numbers, and/or symbols) assigned to, and that may uniquely identify, a given volume host. Meanwhile, each backup operation entry (124A-124N) may refer to a tuple or logical container within which information, corresponding to a given backup operation that had originated from the given volume host, may be stored, in whole or in part, and temporarily or permanently. The aforementioned information, pertaining to the given backup operation stored within a backup operation entry (124A-124N), may include, but may not be limited to, a backup timestamp (126), one or many backup container(s) (128), a writer-object table (130), an object metadata schema (132), and a writer-key table (134). Each of these backup operation entry (124A-124N) elements is described below.

In one or many embodiment(s) of the invention, the backup timestamp (126) may refer to encoded information reflecting a date and/or time at or on which the given backup operation had initiated. Alternatively, the backup time stamp (126) may reflect a date and/or time at or on which the given backup operation had completed.

In one or many embodiment(s) of the invention, a backup container (128) may refer to a container format (or metafile) configured to enable multiple data streams (as well as metadata detailing said data streams) to be embedded into a single file. Further, a backup container (128) may include a consistent shadow copy (described above) (see e.g., FIG. 1A) of one or many file-system object(s) belonging to or associated with a given workload (e.g., software application, operating system, utility, service, etc.) operating on the given volume host. Collectively, the backup container(s) (128) may encompass data and/or metadata, pertinent to one or many workload(s) operating on the given volume host, which had been targeted for protection by the given backup operation. By way of an example, a backup container (128) may employ a common data stream format (CDSF) configuration.

In one or many embodiment(s) of the invention, the writer-object table (130) may refer to a data structure or a collection of data entries, where each data entry maps a VSS writer (described above) (see e.g., FIG. 1A) to one or many file-system object(s). The file-system object(s), mapped to a given VSS writer, may encompass information that the given VSS writer created, modified, and/or otherwise accessed while exercising their respective operations and/or responsibilities. Further, a VSS writer may correspond to a workload (e.g., software application, operating system utility, service, etc.) operating on the given volume host. Accordingly, the writer-object table (130) may collectively track the workload(s) and the respective file-system object(s) associated therewith, which had been protected by the given backup operation. The writer-object table (130) is illustrated and described in further detail with respect to FIG. 2A, below.

In one or more embodiment(s) of the invention, the object metadata schema (132) may refer to a data structure or a collection of data entries, where each data entry maps a file-system object key for a file-system object to file-system object metadata descriptive of the file-system object. The object metadata schema (132), accordingly, may collectively track the file-system object(s) and the respective file-system object metadata associated therewith, which had been protected by the given backup operation. By way of an example, the object metadata schema (132) may employ a SQLite relational database file format. The object metadata schema (132) is illustrated and described in further detail with respect to FIG. 2B, below.

In one or more embodiment(s) of the invention, the writer-key table (134) may refer to a data structure or a collection of data entries, where each data entry maps a VSS writer to one or many file-system object key(s). The writer-key table (134), accordingly, may collectively track the workload(s) and the respective file-system object key(s) associated therewith, which had been protected by the given backup operation. The writer-key table (134) is illustrated and described in further detail with respect to FIG. 2C, below.

While FIG. 1C shows a configuration of components and/or subcomponents, other backup target (104) configurations may be used without departing from the scope of the invention.

Figure 2A:
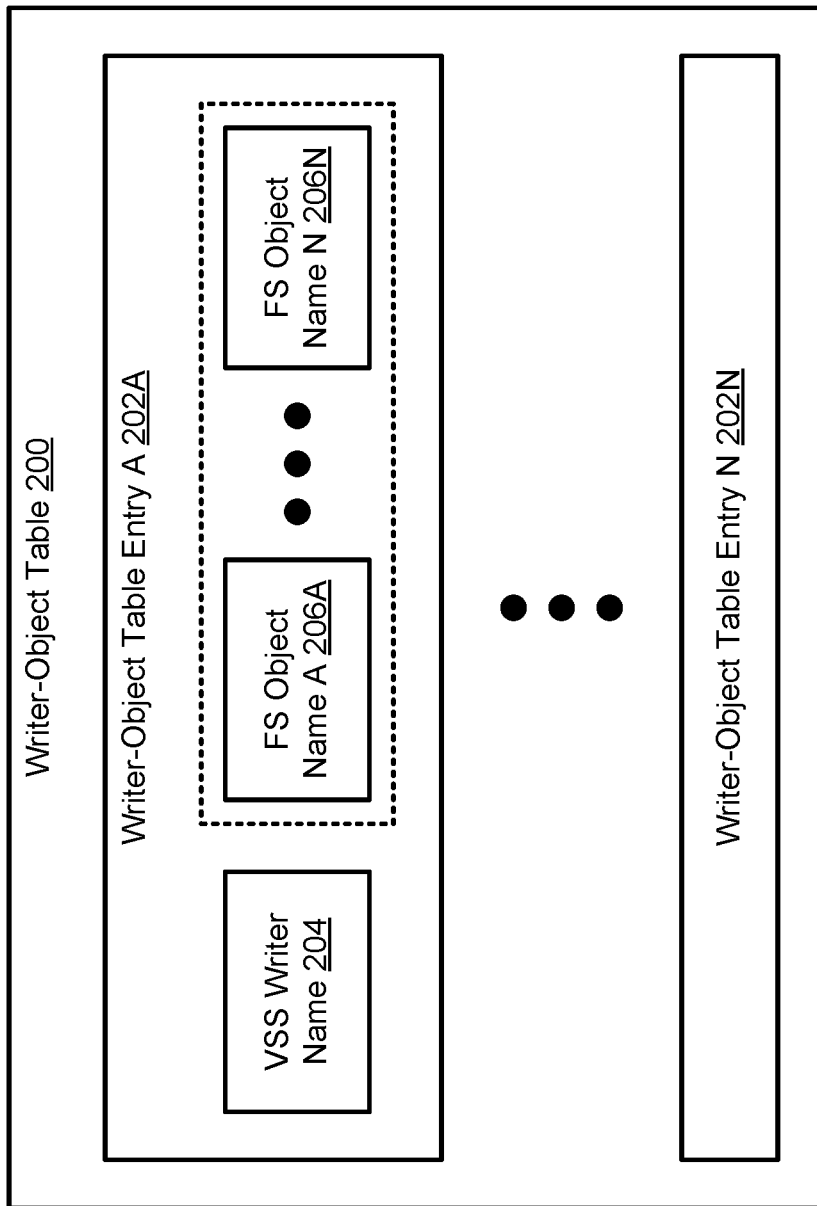
FIG. 2A shows a writer-object table in accordance with one or more embodiments of the invention.

FIG. 2A shows a writer-object table in accordance with one or more embodiments of the invention. The writer-object table (200) (introduced above) (see e.g., FIG. 1C) may include one or many writer-object table entry (entries) (202A-202N). Each writer object table entry (202A-202N) may pertain to a given VSS writer, or a workload (e.g., software application, operating system, utility, service, etc.) operating on a volume host, and the respective file-system object(s) associated therewith. To that end, each writer-object table entry (202A-202N) may include a VSS writer name (204) and one or many file-system object name(s) (206A-206N). Each of these writer-object table entry (202A-202N) subcomponents is described below.

In one or many embodiment(s) of the invention, the VSS writer name (204) may refer to a character string (e.g., a series of characters including letters, numbers, and/or symbols) assigned to, and that may uniquely identify, a given VSS writer.

In one or many embodiment(s) of the invention, a file-system (FS) object name (206A-206N) may refer to a character string (e.g., a series of characters including letters, numbers, and/or symbols) assigned to, and that may uniquely identify, a file-system object (e.g., file or directory). By way of an example, any file-system object name (206A-206N) may reflect a file-system path for the file-system object, which may uniquely identify a location where the file-system object is maintained in a file-system structure.

While FIG. 2A shows a configuration of components and/or subcomponents, other writer-object table (200) configurations may be used without departing from the scope of the invention.

Figure 2B:
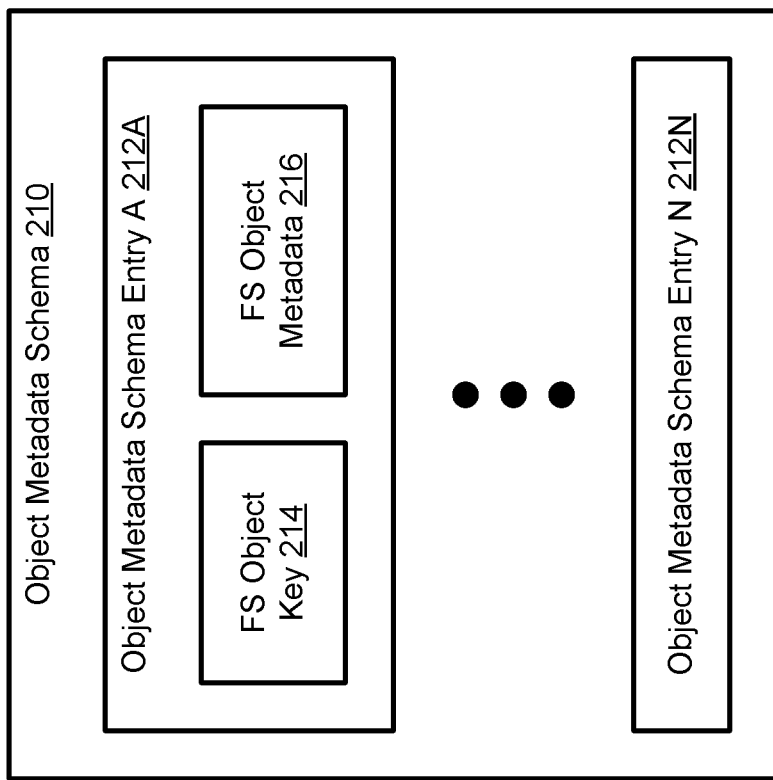
FIG. 2B shows an object metadata schema in accordance with one or more embodiments of the invention.

FIG. 2B shows an object metadata schema in accordance with one or more embodiments of the invention. The object metadata schema (210) (introduced above) (see e.g., FIG. 1C) may include one or many object metadata schema entry (entries) (212A-212N). Each object metadata schema entry (212A-212N) may pertain to a given file-system object (e.g., file or directory) and the respective metadata associated therewith. To that end, each object metadata schema entry (212A-212N) may include a file-system (FS) object key (214) and file-system object metadata (216). Each of these object metadata schema entry (212A-212N) subcomponents is described below.

In one or many embodiment(s) of the invention, the file-system object key (214), for a given file-system object, may refer to globally unique information relating to the given file-system object. Further, the file-system object key (214) may serve as a connection (or relational) bridge between the object metadata schema (210) and a writer-key table (see e.g., FIG. 2C). By way of an example, the file-system object key (214), for a given file-system object, may reference a backup container record index assigned to the given file-system object. The backup container record index may indicate a sequential record number, for a record within a given backup container (described above) (see e.g., FIG. 1C), mapped to the given file-system object.

In one or many embodiment(s) of the invention, the file-system object metadata (216), for a given file-system object, may generally refer to information descriptive of the given file-system object, which may include, but may not be limited to: a file-system generated identifier (ID) assigned to the given file-system object; a file-system generated parent ID of a parent file-system object (if any) for the given file-system object; a user-specified name labeling the given file-system object; a Boolean value (e.g., 1 or 0, false or true) reflecting whether the given file-system object represents a directory; a file-system object hash (described below) generated for the given file-system object; a storage size (e.g., in bytes) of the given file-system object; a header size (e.g., in bytes) of header information associated with the given file-system object; a footer size (e.g., in bytes) of footer information associated with the given file-system object; a backup container ID assigned to the backup container (described above) (see e.g., FIG. 1C) wherein a consistent shadow copy of, or including, the given file-system object is stored; a backup container offset indicating a relative position or location (e.g., in bytes, blocks, etc.), or displacement from a starting position or location of the backup container, at which a consistent shadow copy of, or including, the given file-system object is stored within the backup container; and a file-system object checksum (described below) generated for the given file-system object. The file-system object metadata (216) is not limited to the aforementioned specific examples.

In one or many embodiment(s) of the invention, the file-system object hash, for a given file-system object, may refer to an uniquely-identifying fingerprint for the file-system object metadata (216) thereof, which may be derived or generated from the application of a hash function onto one or many combination(s) of at least a subset of the information reflective of the file-system object metadata (216). The applied hash function may refer to a mathematical or computer algorithm that maps, converts, or encodes an arbitrary-sized input character string to a fixed-sized output bit array. Further, the applied hashing function may be implemented using any existing hash function. Moreover, by way of an example, generation of the file-system object hash, for a given file-system object, may entail the non-limiting procedure outlined below.

Example File-System Object Hash Generation Procedure

1. Generate first arbitrary-sized input character string through merging (e.g., concatenation) of the following information associated with the given file-system object: the backup container record index and the backup container offset
2. Generate first fixed-sized output bit array through application of hash function onto first arbitrary-sized input character string
3. Generate second arbitrary-sized input character string through merging (e.g., concatenation) of the following information associated with the given file-system object: the backup container record index, the file-system generated ID, the file-system generated parent ID, the user-specified name, and the Boolean value reflecting whether the given file-system object represents a directory
4. Generate second fixed-sized output bit array through application of hash function onto second arbitrary-sized input character string
5. Generate third arbitrary-sized input character string through merging (e.g., concatenation) of the following information associated with the given file-system object: the backup container record index, the storage size, the header size, the footer size, the file-system object checksum, and the backup container ID
6. Generate third fixed-sized output bit array through application of hash function onto third arbitrary-sized input character string
7. Generate fourth arbitrary-sized input character string through merging (e.g., concatenation) of the first, second, and third fixed-sized output bit arrays
8. Generate fourth fixed-sized output bit array (i.e., file-system object hash) through application of hash function onto fourth arbitrary-sized input character string In one or many embodiment(s) of the invention, the file-system object checksum, for a given file-system object, may refer to an integrity-verifying signature derived or generated from the application of a hash function onto the content (i.e., data) of the file-system object. The applied hash function may refer to a mathematical or computer algorithm that maps, converts, or encodes an arbitrary-sized input character string to a fixed-sized output bit array. Further, the applied hashing function may be implemented using any existing hash function.

While FIG. 2B shows a configuration of components and/or subcomponents, other object metadata schema (210) configurations may be used without departing from the scope of the invention.

Figure 2C:
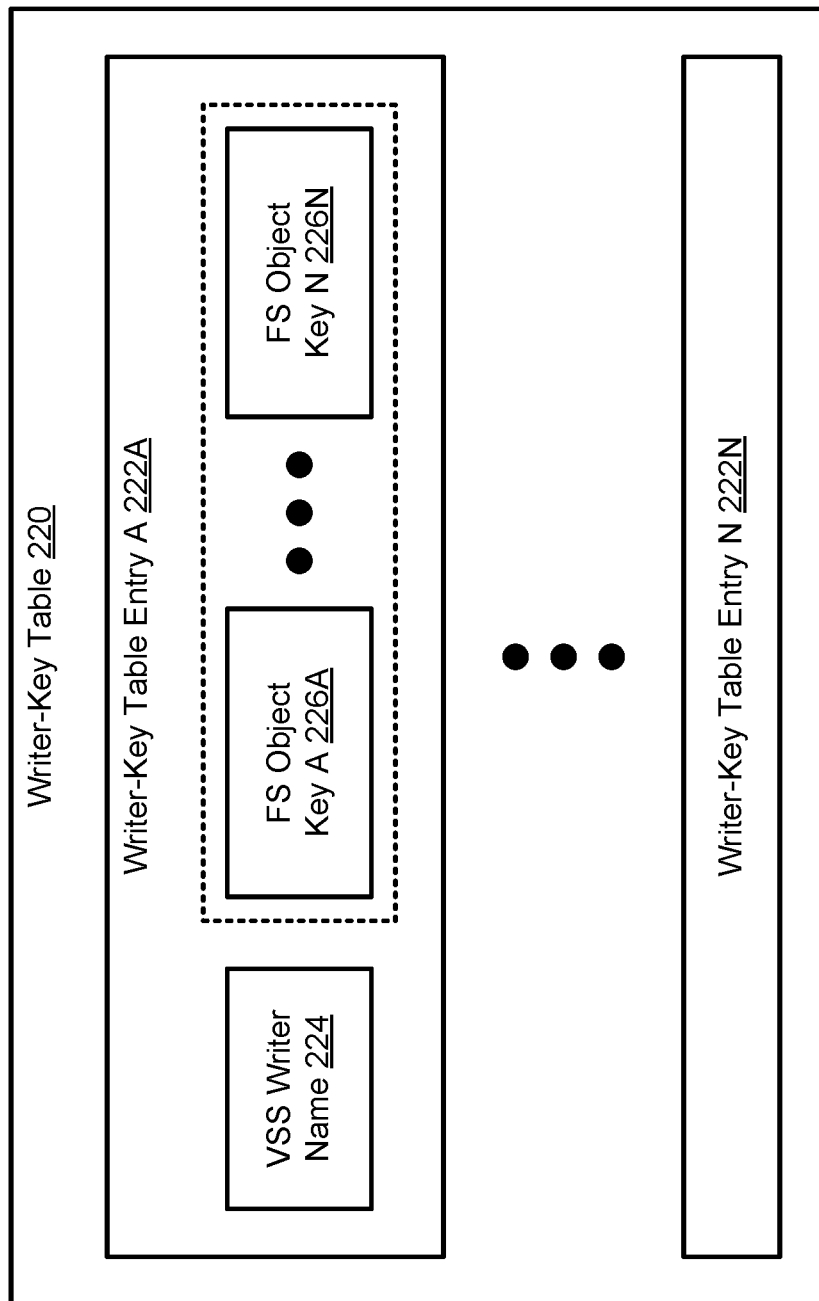
FIG. 2C shows a writer-key table in accordance with one or more embodiments of the invention.

FIG. 2C shows a writer-key table in accordance with one or more embodiments of the invention. The writer-key table (220) (introduced above) (see e.g., FIG. 1C) may include one or many writer-key table entry (entries) (222A-222N). Each writer-key table entry (222A-222N) may pertain to a given VSS writer or a workload (e.g., software application, operating system, utility, service, etc.) operating on a volume host, and the respective file-system object(s) associated therewith. To that end, each writer-key table entry (222A-222N) may include a VSS writer name (224) and one or many file-system (FS) object key(s) (226A-226N). Each of these writer-key table entry (222A-222N) subcomponents is described below.

In one or many embodiment(s) of the invention, the VSS writer name (224) may refer to a character string (e.g., a series of characters including letters, numbers, and/or symbols) assigned to, and that may uniquely identify, a given VSS writer.

In one or many embodiment(s) of the invention, the file-system object key (226A-226N), for a given file-system object, may refer to globally unique information relating to the given file-system object. Further, the file-system object key (226A-226N) may serve as a connection (or relational) bridge between an object metadata schema (see e.g., FIG. 2B) and the writer-key table (220). By way of an example, the file-system object key (226A-226N), for a given file-system object, may reference a backup container record index assigned to the given file-system object. The backup container record index may indicate a sequential record number, for a record within a given backup container (described above) (see e.g., FIG. 1C), mapped to the given file-system object.

While FIG. 2C shows a configuration of components and/or subcomponents, other writer-key table (220) configurations may be used without departing from the scope of the invention.

Figure 2D:
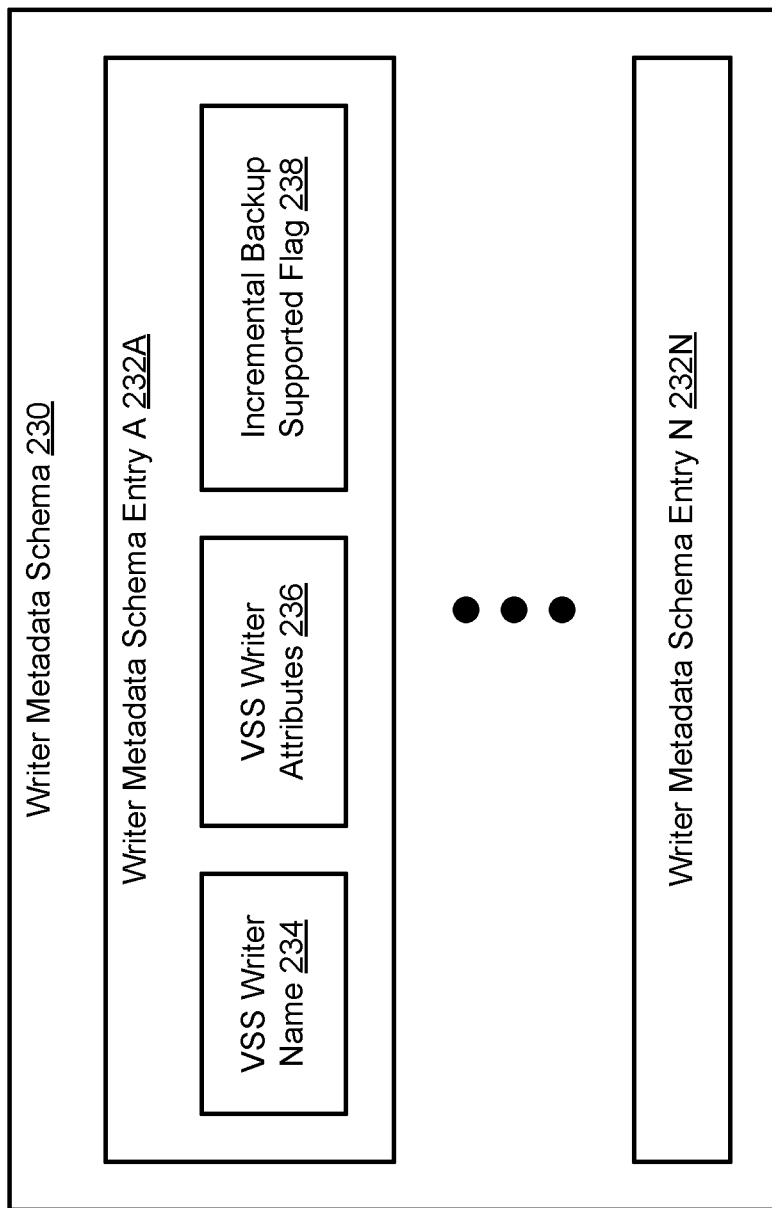
FIG. 2D shows a writer metadata schema in accordance with one or more embodiments of the invention.

FIG. 2D shows a writer metadata schema in accordance with one or more embodiments of the invention. The writer metadata schema (230) may refer to a data structure that consolidates metadata descriptive of one or many VSS writer(s). Accordingly, the writer-metadata schema (230) may include one or many writer-metadata schema entry (entries) (232A-232N). Each writer metadata schema entry (232A-232N) may pertain to a given VSS writer, or a workload (e.g., software application, operating system, utility, service, etc.) operating on a volume host, and the respective metadata associated therewith. To that end, each writer metadata schema entry (232A-232N) may include a VSS writer name (234), a set of VSS writer attributes (236), and an incremental backup supported flag (238). Each of these writer metadata schema entry (232A-232N) subcomponents is described below.

In one or many embodiment(s) of the invention, the VSS writer name (234) may refer to a character string (e.g., a series of characters including letters, numbers, and/or symbols) assigned to, and that may uniquely identify, a given VSS writer.

In one or many embodiment(s) of the invention, a VSS writer attribute (236) may refer to a parameter that may reflect a nature of the given VSS writer, including configuration and/or operational characteristics.

In one or many embodiment(s) of the invention, the incremental backup supported flag (238) may refer to a tristate variable that reflects a status concerning an ability of a given VSS writer to support incremental backup operations. In contrast to a full backup operation, which entails the protection of all state, data, and/or metadata associated with a target entity (e.g., an operating system, a software application, a utility, a service, etc.), an incremental backup operation may alternatively entail the protection of change(s) or difference(s) in state, data, and/or metadata, associated with the target entity, since a last or previous full or incremental backup operation. Further, as a tristate variable, the incremental backup supported flag (238) may indicate one of the following three possible states: (a) a null state representative of an initial value assigned to the incremental backup supported flag (238) when the writer metadata schema entry (232A-232N) is created; (b) a false state or value representative that the given VSS writer does not support incremental backup operations; and (c) a true state or value representative that the given VSS writer does support incremental backup operations.

While FIG. 2D shows a configuration of components and/or subcomponents, other writer metadata schema (230) configurations may be used without departing from the scope of the invention.

Figure 2E:
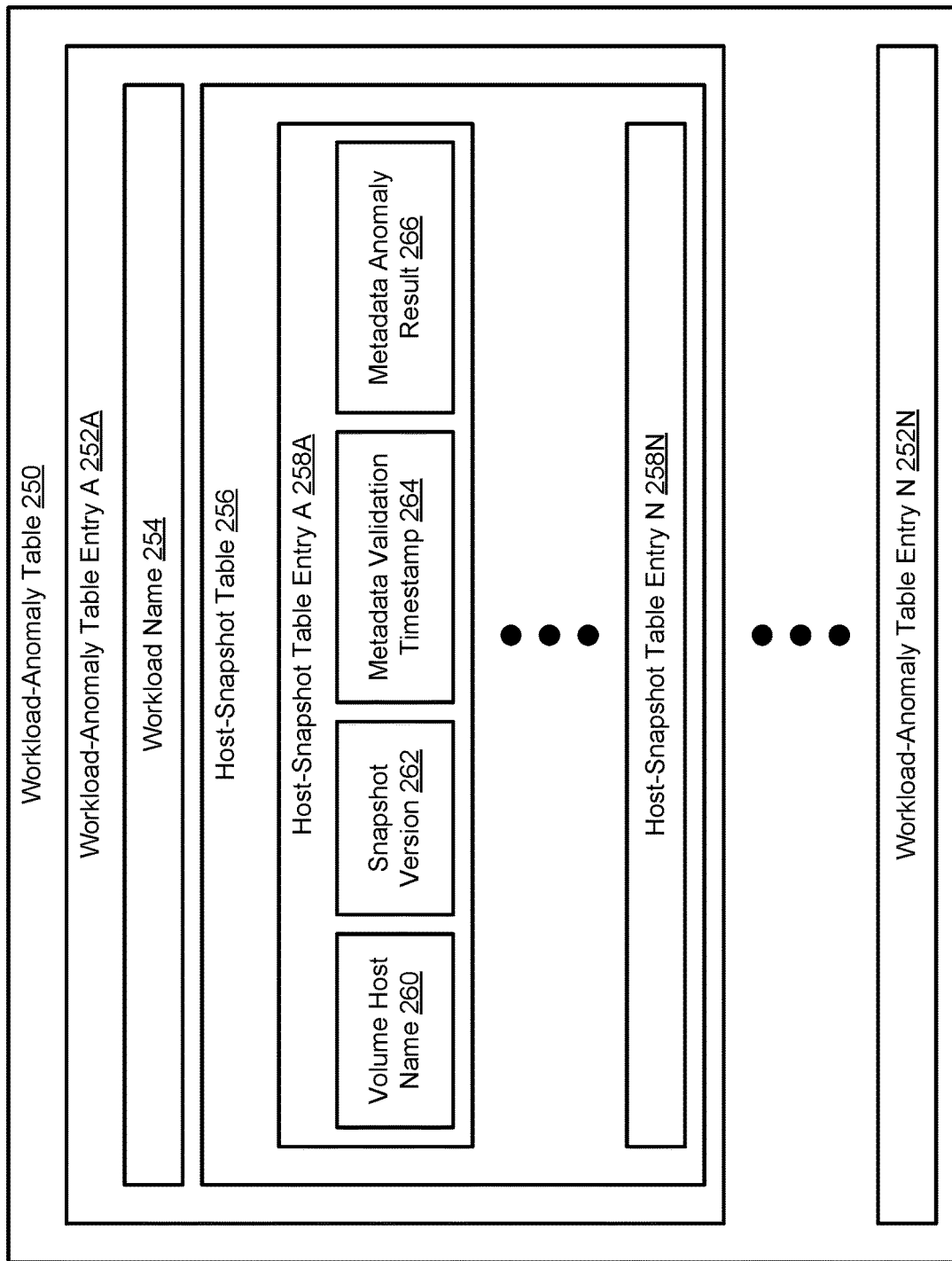
FIG. 2E shows a workload-anomaly table in accordance with one or more embodiments of the invention.

FIG. 2E shows a workload-anomaly table in accordance with one or more embodiments of the invention. The workload-anomaly table (250) may refer to a data structure or a logical container that tracks anomalies (if any) between shared workloads operating on multiple computing systems (e.g., volume hosts) within one or many information technology (IT) environment(s) (e.g., data center(s)) belonging to an organization. Accordingly, the workload-anomaly table (250) may include one or many workload-anomaly table entry (entries) (252A-252N). Each workload-anomaly table entry (252A-252N) may pertain to a shared workload (e.g., software application, operating system, utility, service, etc.) operating as a separate instance on at least two volume hosts.

To that end, in one or many embodiment(s) of the invention, each workload-anomaly table entry (252A-252N) may include a workload name (254) and a host-snapshot table (256). The workload name (254) may refer to a character string (e.g., a series of characters including letters, numbers, and/or symbols) assigned to, and that may uniquely identify, a given shared workload. Meanwhile, the host-snapshot table (256) may refer to a data structure or a logical container that may be used for tracking the behavior (e.g., anomalous or normal) of shared workload instances, respectively, operating across multiple volume hosts. The host-snapshot table (256), therefore, may include multiple (i.e., at least two) host-snapshot table entries (258A-258N). Each host-snapshot table entry (258A-258N) may refer to a tuple or logical container pertaining to a given volume host, which may store, in whole or in part, and temporarily or permanently, information descriptive of the given volume host, as well as of the instance of the given shared workload operating thereon. Said information, accordingly, may include, but may not be limited to, a volume host name (260), a snapshot version (262), a metadata validation timestamp (264), and a metadata anomaly result (266). Each of these host-snapshot table entry (258A-258N) subcomponents is described below.

In one or many embodiment(s) of the invention, the volume host name (260) may refer to a character string (e.g., a series of characters including letters, numbers, and/or symbols) assigned to, and that may uniquely identify, the given volume host (see e.g., FIGS. 1A and 1B) with which the host-snapshot table entry (258A-258N) may be associated.

In one or many embodiment(s) of the invention, the snapshot version (262) may refer to classification designated for the given shared workload instance that operates on the given volume host. Specifically, said classification may indicate whether the given shared workload instance, on the given volume host, is considered the master or golden shared workload instance (which may serve as an ideal behavioral reference against which the other shared workload instance(s) may be compared), or alternatively, is considered a non-master or non-golden shared workload instance (which may be compared against the master/golden shared workload instance to ascertain any anomalous behavior suspected to be exhibited thereby).

In one or many embodiment(s) of the invention, the metadata validation timestamp (264) may generally refer to encoded information reflecting a date and/or time at or on which a relevant event occurred. If the given shared workload instance represents the master/golden shared workload instance, the aforementioned relevant event may reference a point-in-time when file-system object metadata, respective to one or many file-system object(s) associated with the given shared workload instance, is retrieved from a backup target (see e.g., FIGS. 6A-6C). Alternatively, if the given shared workload instance instead represents a non-master/non-golden shared workload instance, the aforementioned relevant event may alternatively reference a point-in-time when file-system object metadata, respective to one or many file-system object(s) associated with the given shared workload instance, is assessed against other file-system object metadata respective to one or many file-system object(s) associated with the master/golden shared workload instance.

In one or many embodiment(s) of the invention, the metadata anomaly result (266) may refer to a tristate variable that reflects a status describing a behavior exhibited by the given shared workload instance operating on the given volume host. Further, as a tristate variable, the metadata anomaly result (266) may indicate one of the following three possible states: (a) a null state that may be associated with the given shared workload instance should it be determined that the given shared workload instance represents the master/golden shared workload instance; (b) a suspect state that may be associated with the given shared workload instance should it be determined that a behavior (e.g., abnormal or anomalous) exhibited by the given shared workload instance is dissimilar to a behavior (e.g., normal or ideal) exhibited by the master/golden shared workload instance; and (c) a non-suspect state that may be associated with the given shared workload instance should it be determined that a behavior (e.g., normal or ideal) exhibited by the given shared workload instance is similar to a behavior (e.g., normal or ideal) exhibited by the master/golden shared workload instance.

While FIG. 2E shows a configuration of components and/or subcomponents, other workload-anomaly table (250) configurations may be used without departing from the scope of the invention.

Figure 2F:
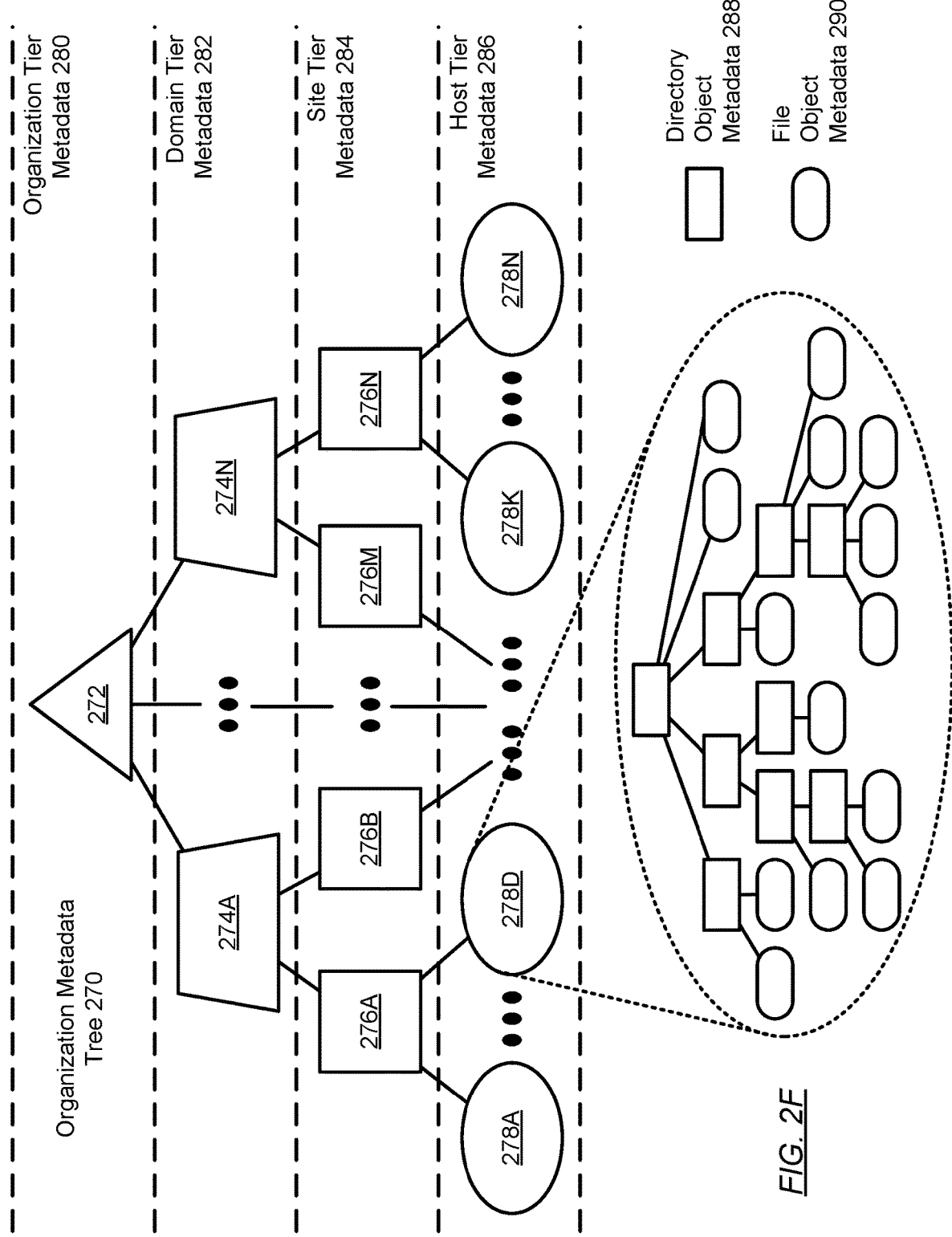
FIG. 2F shows an organization metadata tree in accordance with one or more embodiments of the invention.

FIG. 2F shows an organization metadata tree in accordance with one or more embodiments of the invention. The organization metadata tree (270) may represent a hierarchical data structure that aggregates and presents metadata, as well as insights that may be inferred therefrom, concerning one or many information technology (IT) environment(s) belonging to an organization. The foundation of the organization metadata tree (270) may encompass metadata, or more specifically, file-system object metadata, that may be generated and/or collected through backup operations targeting various workload (e.g., software application, operating system, utility, service, etc.) data maintained across multiple computing systems (e.g., volume hosts) forming the aforementioned IT environment(s) belonging to an organization.

In one or many embodiment(s) of the invention, the organization metadata tree (270) may consolidate metadata through a set of nodes (i.e., metadata nodes) (e.g., 272, 274A-274N, 276A-276N, 278A-278N) that may be topologically interconnected based on active directory topology information, which may be maintained by and extracted from active directories on at least a subset of the multiple computing systems forming the IT environment(s) belonging to an organization. An active directory may refer to a service (e.g., a computer program) that organizes, locates, and manages network resources (e.g., volumes, file-system objects, computing systems, users, etc.) across the IT environment(s), or at least one or many portion(s) thereof, belonging to an organization. Further, active directory topology information may include, but may not be limited to, information that may assemble network resources into logical groupings and, further, connect or link said logical groupings in a hierarchical manner.

In one or many embodiment(s) of the invention, the above-mentioned set of metadata nodes, forming the organization metadata tree (270), may each correspond to an aggregation or collection of file-system object metadata pertaining to a logical grouping of network resources. Based on the respective extent of file-system object metadata aggregation, each metadata node may further be associated with a logical tier of any number of logical tiers (e.g., 280, 282, 284, 286). A logical tier may reference a classification of network resources (and thus any aggregation of file-system object metadata associated therewith) based on a size or footprint of the IT infrastructure to which the network resources belong.

In one or many embodiment(s) of the invention, the network resources within the IT environment(s) of an organization, may be classified (from least to greatest IT infrastructure size) into a host tier (286), a site tier (284), a domain tier (282), and an organization tier (280). Each of these logical tiers is described below.

In one or many embodiment(s) of the invention, the host tier (286) may classify and thus include network resources that may reside within or belong to any single volume host. In this context, a volume host may encompass a computing system (see e.g., FIG. 7), wherein a collection of file-system objects (e.g., files and/or directories) thereon may be managed. Further, any metadata node (i.e., any leaf metadata node) (e.g., 278A-278N) representative of a host-sized logical grouping of network resources, accordingly, may be associated with an aggregation of file-system object metadata (e.g., including file object metadata (290) and directory object metadata (288)) respective to the collection of file-system objects maintained on or managed by a single volume host.

In one or many embodiment(s) of the invention, the site tier (284) may classify and thus include network resources that may reside within or belong to any single data center. In this context, a data center may refer to a group of co-located volume hosts, wherein multiple collections of file-system objects there-across may be managed. Further, any metadata node (e.g., 276A-276N) representative of a site-sized logical grouping of network resources, accordingly, may be associated with a combined aggregation of file-system object metadata respective to the multiple collections of file-system objects maintained across or managed by a group of co-located volume hosts.

In one or many embodiment(s) of the invention, the domain tier (282) may classify and thus include network resources that may reside within or belong to any single data center domain. In this context, a data center domain may refer to a group of data centers (e.g., related by purpose or product(s) and/or service(s) offered), wherein a super-collection (i.e., sets of multiple collections) of file-system objects there-across may be managed. Further, any metadata node (e.g., 274A-274N) representative of a domain-sized logical grouping of network resources, accordingly, may be associated with a combined aggregation of file-system object metadata respective to the super-collection of file-system objects maintained across or managed by a group of data centers.

In one or many embodiment(s) of the invention, the organization tier (280) may classify and thus include network resources that may reside within or belong to an organization in entirety. In this context, an organization may refer to an enterprise including multiple data center domains, wherein any and all file-system objects of the organization may be managed. Further, the metadata node (i.e., root metadata node) (e.g., 272) representative of an organization-sized logical grouping of network resources, accordingly, may be associated with a combined aggregation of file-system object metadata respective to any and all file-system objects maintained across or managed by multiple data center domains.

In one or many embodiment(s) of the invention, the organization metadata tree (270) may structurally resemble a parent-child tree, where the set of metadata nodes may be organized and thus linked based on parent-child relationships. Following said parent-child relationships, the organization metadata tree (270) may mandate that any child metadata nodes may each have and may thus be linked to only one parent metadata node, whereas any parent metadata nodes may each have and may thus be linked to one or many child metadata node(s). A parent metadata node to any given metadata node may reference the metadata node linked to the given metadata node that belongs to a higher logical tier than the logical tier to which the given metadata node belongs. Conversely, a child metadata node to any given metadata node may reference a metadata node linked to the given metadata node that belongs to a lower logical tier than the logical tier to which the given metadata node belongs. Metadata nodes (e.g., 278A-278N) lacking any child metadata nodes may also be referred herein as leaf metadata node, whereas metadata nodes (e.g., 272, 274A-274N, 276A-276N) linking to at least one child metadata node may also be referred herein as a non-leaf metadata node. Further, the topmost metadata node (e.g., 272) of the organization metadata tree (270) may also be referred herein as the root metadata node.

While FIG. 2F shows a configuration of components and/or subcomponents, other organization metadata tree (270) configurations may be used without departing from the scope of the invention. For example, the organization metadata tree (270), and thus the IT environment(s) belonging to an organization, may be organized using more or less logical tiers than those logical tiers presented through the exemplary embodiment illustrated in FIG. 2F.

FIGS. 3A-3E show a flowchart describing a method for enabling incremental backup operations in accordance with one or more embodiments of the invention. The various steps outlined below may be performed by the protection agent on any volume host (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Figure 3A:
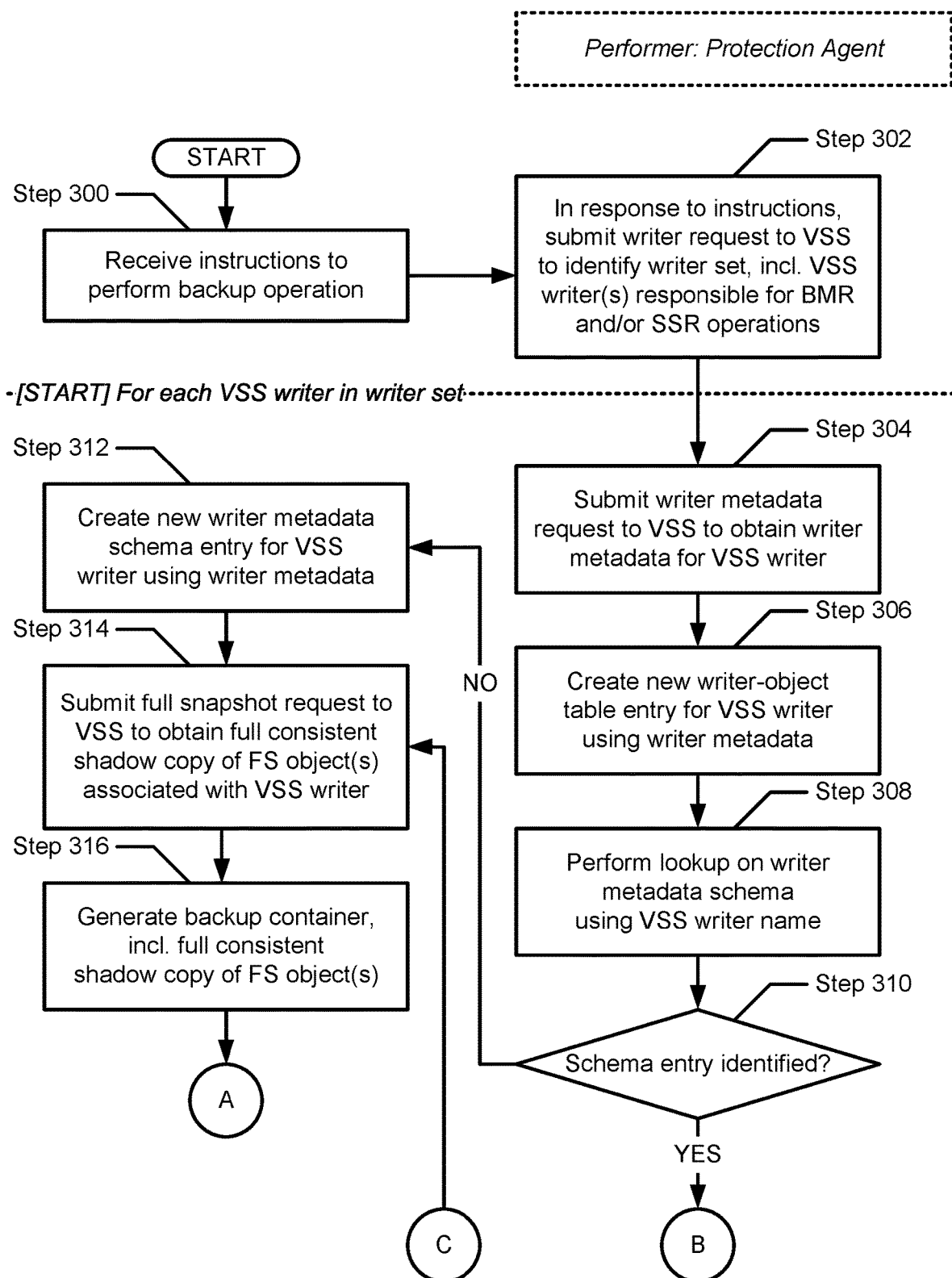
FIGS. 3A-3E show a flowchart describing a method for enabling incremental backup operations targeting bare-metal recovery and system-state recovery data and metadata in accordance with one or more embodiments of the invention.

Turning to FIG. 3A, in Step 300, instructions to perform a backup operation is received. In one or many embodiment(s) of the invention, the instructions may correspond to an on-demand request, or a scheduled periodic request, to perform the backup operation. Further, the backup operation may target one or many workload(s) (e.g., software application(s), operating system(s), utility (utilities), service(s), etc.) that may be operating on a volume host. Particularly, the targeted workload(s), as well as their respective file-system object(s) (i.e., file(s) and/or directory (directories)) maintained in one or many volume(s) on the volume host, may be pertinent to bare-metal recovery and/or system-state recovery operations directed to said volume host.

In one or many embodiment(s) of the invention, a bare-metal recovery operation may entail the restoration of a whole computing system (e.g., a volume host), including any workload instance(s), their respective state (e.g., configuration and/or operational parameters) at a given point-in-time, and any granularity of their respective data and/or metadata maintained at the given point-in-time, which had collectively resided on said computing system (often prior to a failover event). Further, said entirety of a computing system may be backed-up on one or many backup target(s) in a form that enables said entirety of the computing system to be restored on any bare-metal computing system (i.e., any computing system lacking installed workload(s) thereon yet).

In one or many embodiment(s) of the invention, a system-state recovery operation may entail the restoration of critical operating system components for when an operating system on a computing system is lost or damaged. These critical operating system components may include, but may not be limited to, operating system boot files, component object model (COM+) class registration database(s), system registry (registries), active directory (directories), and system volume(s).

In Step 302, in response to the instructions (received in Step 300), a writer request is submitted to the volume shadow copy service (VSS) (described above) (see e.g., FIG. 1B) operating on the volume host whereon the protection agent may be operating. In one or many embodiment(s) of the invention, in response to the writer request, a writer set may be identified and provided by the VSS. The writer set may refer to a list that discloses one or many VSS writer(s) (i.e., workload(s)—e.g., operating system(s), software application(s), utility (utilities), service(s), etc.) which may be pertinent to the above-mentioned bare-metal recovery and/or system-state recovery operations on the volume host.

Hereinafter, a subset of the remaining steps (i.e., Steps 304 to 394, excluding Step 328) may be performed, iteratively as a whole, for each VSS writer in the writer set (identified in Step 302). For example, a first iteration of the indicated remaining steps subset may be performed with respect to a first VSS writer specified in the writer set; thereafter, a second iteration of the indicated remaining steps subset may be performed with respect to a second VSS writer (if any) specified in the writer set; and so forth, including a last iteration of the indicated remaining steps subset that may be performed with respect to a last VSS writer (if any) specified in the writer set. Throughout any given iteration of the indicated remaining steps subset, the VSS writer, respective to the given iteration, may be termed hereinafter as the given VSS writer.

In Step 304, a writer metadata request, relative to the given VSS writer, is submitted to the VSS. In one or many embodiment(s) of the invention, in response to the writer metadata request, writer metadata descriptive of the given VSS writer is subsequently identified and provided by the VSS. Examples of said writer metadata may include, but may not be limited to: writer identification information (e.g., a writer name, a writer class ID, etc.) associated with the given VSS writer; writer-level specifications such as a restore method specification (i.e., indicating a preferred file restoration method for all file-system object(s) managed by the given VSS writer), an exclude file list specification (i.e., indicating any file-system object(s) that is/are not to be included in a backup set), and an alternate location mappings specification (i.e., indicating a location on disk to which the file-system object(s) may be restored should restoration of the file-system object(s) to an original location fails); and component-level information (e.g., component type, component name, component logical path, component selectability for backup/restore, etc.) associated with one or more components (i.e., logical collections of file-system objects, which may be backed-up and restored together) managed by the given VSS writer. Writer metadata is not limited to the aforementioned specific examples.

In Step 306, a new writer object table entry (see e.g., FIG. 2A) is created for the given VSS writer using at least a portion of the writer metadata (obtained in Step 304). In one or many embodiment(s) of the invention, the new writer object table entry may include a VSS writer name and one or many file-system object name(s)—each associated with the given VSS writer. The former may identify the given VSS writer, whereas each of the latter may reflect a file or a directory (encompassing information) that the given VSS writer created, modified, or otherwise accessed while engaged in their respective operations and/or responsibilities.

In Step 308, a lookup is performed on a writer metadata schema (see e.g., FIG. 2D) using the VSS writer name (mentioned in Step 306). Thereafter, in Step 310, a determination is made as to whether the lookup (performed in Step 308) resulted in the identification of a writer metadata schema entry of the writer metadata schema. In one or many embodiment(s) of the invention, if it is determined that an existing writer metadata schema entry had been identified (i.e., where the identified existing writer metadata schema entry specifies the VS S writer name), then the method proceeds to Step 340 (see e.g., FIG. 3C). On the other hand, in one or many other embodiment(s) of the invention, if it is alternatively determined that no existing writer metadata schema entry had been identified (i.e., none of the existing writer metadata schema entry (entries) specifies (specify) the VSS writer name), then the method alternatively proceeds to Step 312 (described below).

In Step 312, following the determination (made in Step 310) that no existing writer metadata schema entry, of the writer metadata schema (see e.g., FIG. 2D), had been identified based on the lookup (performed in Step 308), a new writer metadata schema entry, for the given VSS writer, is created using at least a portion of the writer metadata (obtained in Step 304). In one or many embodiment(s) of the invention, the new writer metadata schema entry may include: a VSS writer name for the given VSS writer; a set of VSS writer attributes associated with the given VSS writer; and an initialized (i.e., null valued) incremental backup supported flag.

In Step 314, following the creation of a new writer metadata schema entry (in Step 312), or following the alternative determination (made in Step 350) (described below) that an incremental backup supported flag state/value for the given VS S writer does not reflect a true state/value (but rather, a false state/value), a full snapshot request is submitted to the VSS. In one or many embodiment(s) of the invention, the VSS may subsequently return location information for a full consistent shadow copy that had been successfully created in response to the full snapshot request. The full consistent shadow copy may encompass a point-in-time snapshot of (i.e., including all data respective to) the file-system object(s) named in the new writer-object table entry (created in Step 306). Further, the full consistent shadow copy may be created using any existing procedure—a non-limiting example of which is disclosed in the detailed description of FIG. 1B, above.

In Step 316, a backup container (described above) (see e.g., FIG. 1C) is generated. In one or many embodiment(s) of the invention, the backup container may include or store the full consistent shadow copy (obtained from the VSS in Step 314). From here, the method proceeds to Step 320 (see e.g., FIG. 3B).

Hereinafter, a subset of the remaining steps (i.e., Steps 320 to 324) may be performed, iteratively as a whole, for each file-system object, named in the new writer-object table entry (created in Step 306), respective to the given VSS writer. For example, a first iteration of the indicated remaining steps subset may be performed with respect to a first named file-system object associated with the given VSS writer; thereafter, a second iteration of the indicated remaining steps subset may be performed with respect to a second named file-system object associated with the given VSS writer (if any); and so forth, including a last iteration of the indicated remaining steps subset that may be performed with respect to a last named file-system object associated with the given VSS writer (if any). Throughout any given iteration of the indicated remaining steps subset, the file-system object, respective to the given iteration, may be termed hereinafter as the given file-system object.

Figure 3B:
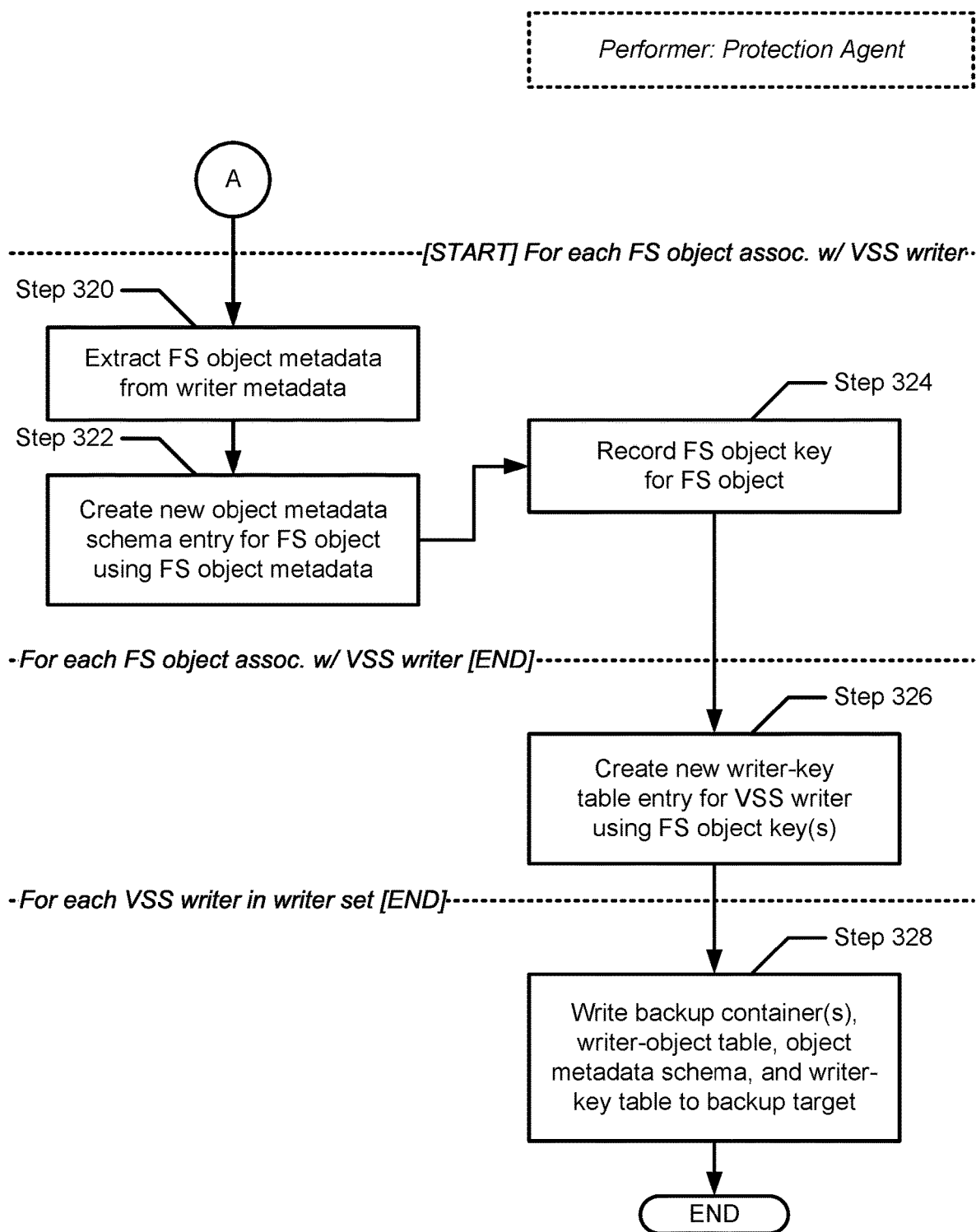

Turning to FIG. 3B, in Step 320, file-system object metadata, descriptive of the given file-system object, is extracted from the writer metadata (obtained in Step 304). Non-limiting examples of the file-system object metadata are disclosed within the detailed description of FIG. 2B, above.

In Step 322, a new object metadata schema entry (see e.g., FIG. 2B) is created for the given file-system object using at least the file-system object metadata (extracted in Step 320). In one or many embodiment(s) of the invention, the new object metadata schema entry may further include a file-system object key for the given file-system object. By way of an example, the file-system object key may reference a backup container record index assigned to the given file-system object. The backup container record index may indicate a sequential record number, for a record within the backup container (generated in Step 316), mapped at least to the given file-system object.

In Step 324, the file-system object key (mentioned in Step 322), for the given file-system object, is recorded.

In Step 326, a new writer-key table entry (see e.g., FIG. 2C), for the given VSS writer, is created. In one or many embodiment(s) of the invention, the new writer-key table entry may include the VSS writer name identifying the given VSS writer and a set of file-system object keys (i.e., including a file-system object key (recorded in Step 324) for each file-system object associated with the given VSS writer).

In Step 328, any above-mentioned information, relevant to the backup operation (triggering instructions of which had been received in Step 300), is written to a backup target. In one or many embodiment(s) of the invention, said information may include: a backup timestamp encoding a date and/or time at or on which the backup operation had triggered; a set of backup containers (i.e., including a backup container (generated in Step 316) for each VSS writer of the writer set (identified in Step 302)); a writer-object table (see e.g., FIG. 2A) (i.e., including a new writer-object table entry (created in Step 306) for each VSS writer of the writer set; an object metadata schema (see e.g., FIG. 2B) (i.e., including a new object metadata schema entry (created in Step 322) for each file-system object associated with each VSS writer of the writer set); and a writer-key table (see e.g., FIG. 2C) (i.e., including a new writer-key table entry (created in Step 326) for each VSS writer of the writer set. Furthermore, said information may be written to or stored on the backup target as content for a new backup operation entry (see e.g., FIG. 1C) under a volume host backup set maintained on the backup target and mapped to the volume host.

Figure 3C:
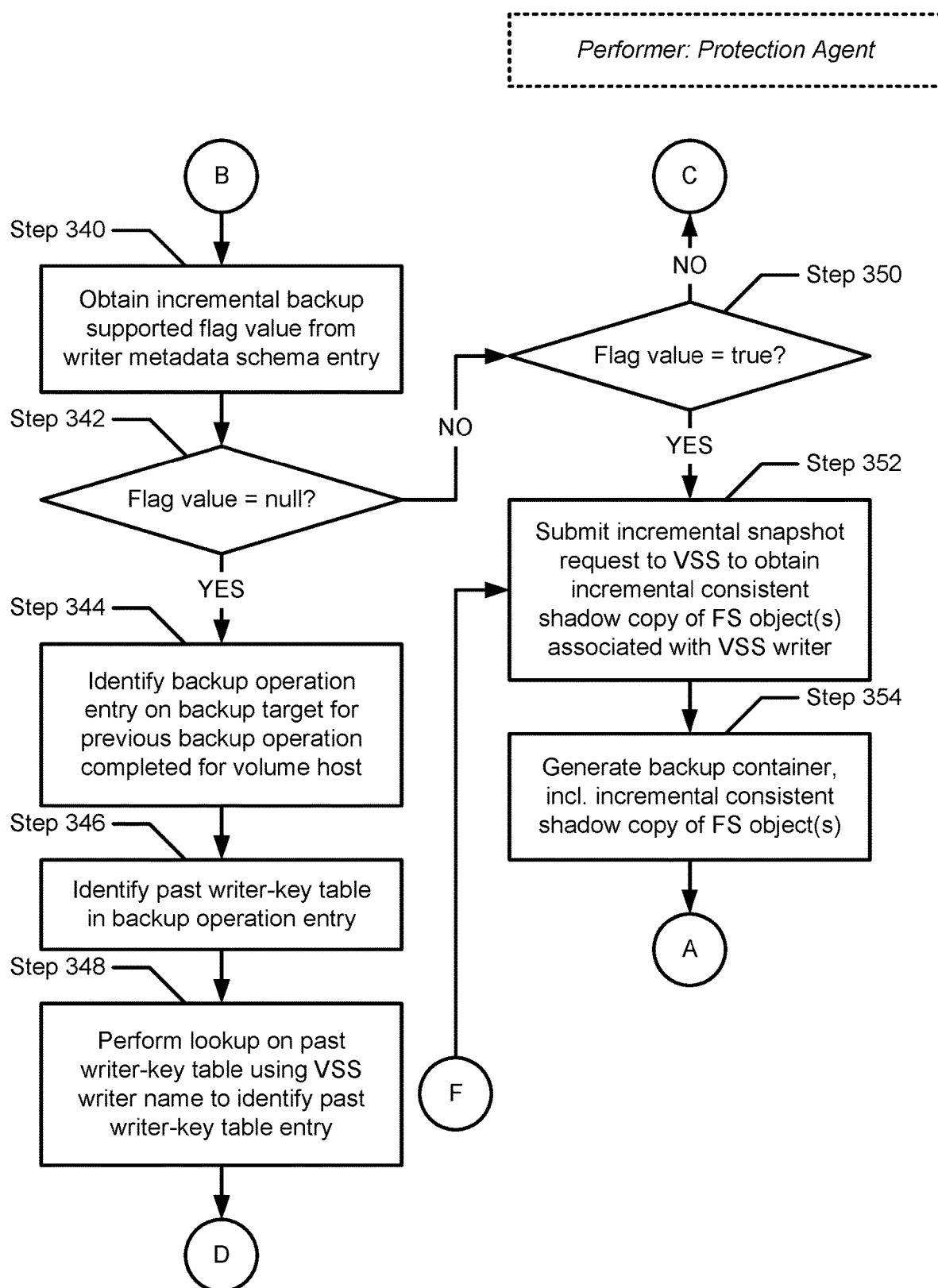

Turning to FIG. 3C, in Step 340, following the alternative determination (made in Step 310) that an existing writer metadata schema entry, of the writer metadata schema (see e.g., FIG. 2D), had been identified based on the lookup (performed in Step 308), an incremental backup supported flag state or value is obtained from the identified, existing writer metadata schema entry. In one or many embodiment(s) of the invention, the incremental backup supported flag may refer to a tristate variable that reflects a status concerning an ability of the given VS S writer to support incremental backup operations. Further, as a tristate variable, the incremental backup supported flag may indicate one of the following three possible states: (a) a null state representative of an initial value assigned to the incremental backup supported flag (i.e., when a new writer metadata schema entry had been created for the given VSS writer in Step 312); (b) a false state or value representative that the given VSS writer does not support incremental backup operations; and (c) a true state or value representative that the given VSS writer does support incremental backup operations.

In Step 342, a determination is made as to whether the incremental backup supported flag state/value (obtained in Step 340) reflects a null state/value. In one or many embodiment(s) of the invention, if it is determined that the incremental backup supported flag state/value does indeed reflect a null state/value, then the method proceeds to Step 344. On the other hand, in one or many other embodiment(s) of the invention, if it is alternatively determined that the incremental backup supported flag state/value does not reflect a null state/value, then the method alternatively proceeds to Step 350.

In Step 344, following the determination (made in Step 342) that the incremental backup supported flag state/value (obtained in Step 340) reflects a null state/value, an existing backup operation entry (see e.g., FIG. 1C), maintained on a backup target, is identified. In one or many embodiment(s) of the invention, the existing backup operation entry may pertain to an immediately previous or last backup operation that had been triggered and completed on the volume host.

In Step 346, a writer-key table (i.e., a past writer-key table) (see e.g., FIG. 2C), specified in the backup operation entry (identified in Step 344), is identified.

In Step 348, a lookup is performed on the past writer-key table (identified in Step 346) using the VSS writer name for the given VSS writer. In one or many embodiment(s) of the invention, the lookup may subsequently yield the identification of an existing writer-key table entry (i.e., a past writer-key table entry) in the past writer-key table, where the past writer-key table entry at least specifies the VSS writer name From here, the method proceeds to Step 360 (see e.g., FIG. 3D).

In Step 350, following the alternative determination (made in Step 342) that the incremental backup supported flag state/value (obtained in Step 340) does not reflect a null state/value, a determination is made as to whether the incremental backup supported flag state/value reflects a true state/value. In one or many embodiment(s) of the invention, if it is determined that the incremental backup supported flag state/value does indeed reflect a true state/value, then the method proceeds to Step 352. On the other hand, in one or many other embodiment(s) of the invention, if it is alternatively determined that the incremental backup supported flag state/value does not reflect a true state/value, then the method alternatively proceeds to Step 314 (see e.g., FIG. 3A).

In Step 352, following the determination (made in Step 350) that the incremental backup supported flag state/value (obtained in Step 340) reflects a true state/value, or following a modification to the incremental backup supported flag state/value (performed in Step 394) (described below) (see e.g., FIG. 3E), an incremental snapshot request is submitted to the VSS. In one or many embodiment(s) of the invention, the VSS may subsequently return location information for an incremental consistent shadow copy that had been successfully created in response to the incremental snapshot request. The incremental consistent shadow copy may encompass a point-in-time snapshot of (i.e., including only change(s) to data respective to) the file-system object(s) named in the new writer-object table entry (created in Step 306). Further, the incremental consistent shadow copy may be created using any existing procedure—a non-limiting example of which is disclosed in the detailed description of FIG. 1B, above.

In Step 354, a backup container (described above) (see e.g., FIG. 1C) is generated. In one or many embodiment(s) of the invention, the backup container may include or store the incremental consistent shadow copy (obtained from the VSS in Step 352). From here, the method proceeds to Step 320 (see e.g., FIG. 3B).

Figure 3D:
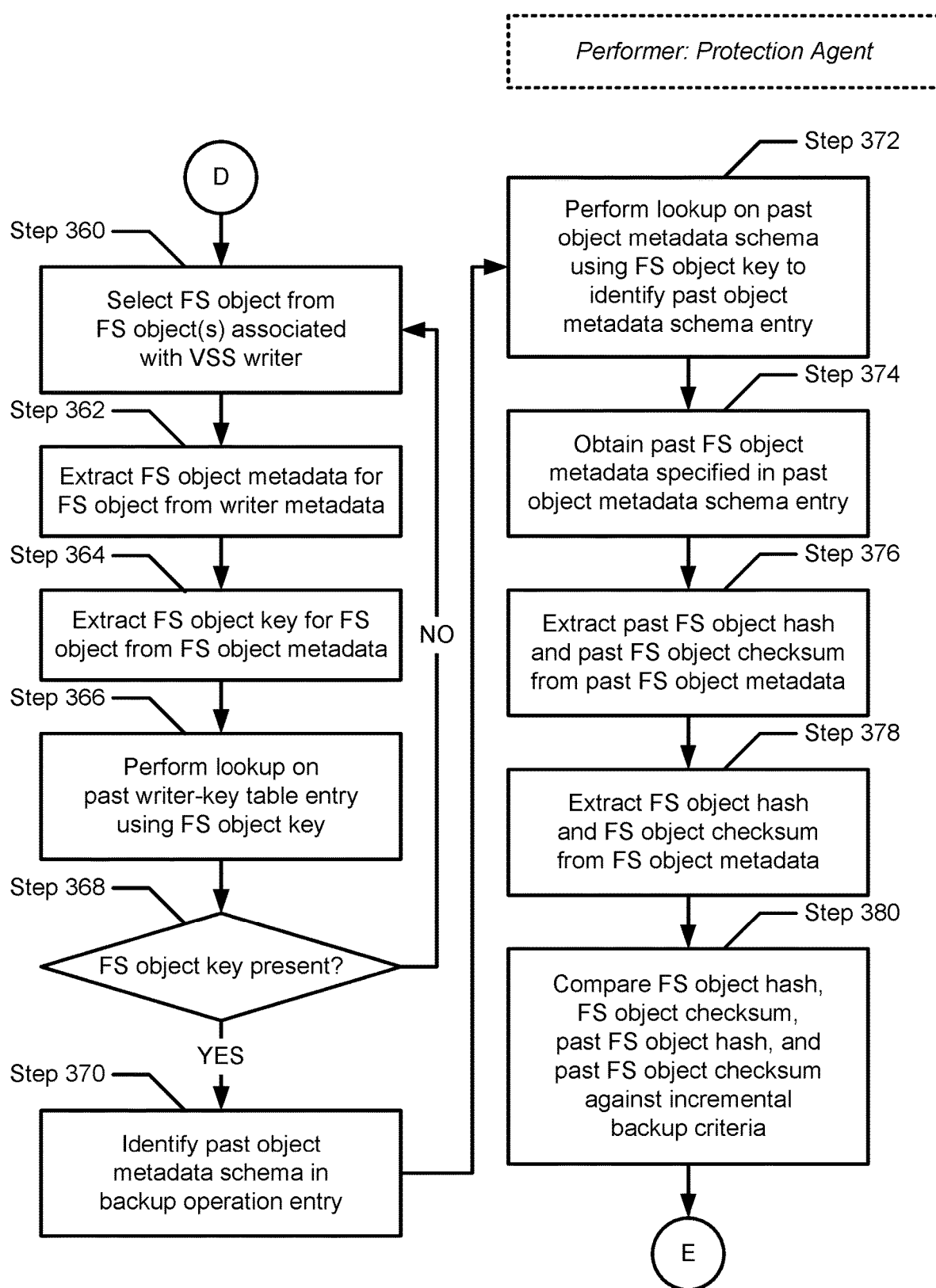

Turning to FIG. 3D, in Step 360, following the identification of the past writer-key table entry (in Step 348), or following the alternative determination (made in Step 368) (described below) that a file-system object key for a yet-to-be-selected file-system object is not present/found in the past writer-key table entry (identified in Step 348), the (yet-to-be-selected) file-system object is selected. In one or many embodiment(s) of the invention, the file-system object may represent one of the file-system object(s) associated with the given VSS writer and named in the new writer-object table entry (created in Step 306).

In Step 362, file-system object metadata, respective to the file-system object (selected in Step 360), is extracted from the writer metadata (obtained in Step 304) for the given VSS writer.

Thereafter, in Step 364, from the file-system object metadata (extracted in Step 362), a file-system object key, for the file-system object (selected in Step 360), is extracted.

In Step 366, a lookup is performed on the past writer-key table entry (identified in Step 348) using the file-system object key (extracted in Step 364).

In Step 368, based on the lookup (performed in Step 366), a determination is made as to whether the past writer-key table entry (identified in Step 348) includes the file-system object key (extracted in Step 364). In one or many embodiment(s) of the invention, if it is determined that the past writer-key table entry does indeed include the file-system object key, then the method proceeds to Step 370. On the other hand, in one or many other embodiment(s) of the invention, if it is alternatively determined that the past writer-key table entry does not include, or excludes, the file-system object key, then the method alternatively proceeds to Step 360 (where another file-system object associated with the given VSS writer may be selected).

In Step 370, following the determination (made in Step 368) that the past writer-key table entry (identified in Step 348) includes the file-system object key (extracted in Step 364) based on the lookup (performed in Step 366), an object metadata schema (i.e., a past object metadata schema) (see e.g., FIG. 2B), specified in the backup operation entry (identified in Step 344), is identified.

In Step 372, a lookup is performed on the past object metadata schema (identified in Step 370) using the file-system object key (extracted in Step 364). In one or many embodiment(s) of the invention, the lookup may result in the identification of an existing object metadata schema entry (i.e., a past object metadata schema entry) in the past object metadata schema, where the past object metadata schema entry at least specifies the file-system object key.

In Step 374, file-system object metadata (i.e., past file-system object metadata), specified in the past object metadata schema entry (identified in Step 372), is obtained.

In Step 376, from the past file-system object metadata (obtained in Step 374), a file-system object hash (i.e., a past file-system object hash) and a file-system checksum (i.e., a past file-system object checksum), respective to the file-system object (selected in Step 360) and both at least specified therein, are extracted.

Similarly, in Step 378, from the file-system object metadata (extracted in Step 362), a file-system object hash and a file-system object checksum, respective to the file-system object (selected in Step 360) and both at least specified therein, are extracted.

In Step 380, a set of comparisons are performed against a predefined incremental backup criteria. Particularly, in one or many embodiment(s) of the invention, a first comparison may be performed between the file-system object hash (extracted in Step 378) and the past file-system object hash (extracted in Step 376), while a second comparison may be performed between the file-system object checksum (extracted in Step 378) and the past file-system object checksum (extracted in Step 376). Further, the predefined incremental backup criteria may outline conditions for determining whether the given VSS writer supports or does not support incremental backup operations; and, henceforth, states that, for the given VSS writer to support incremental backup operations, the file-system object hash and the past file-system object hash must match, whereas the file-system object checksum and the past file-system object checksum may differ.

In one or many embodiment(s) of the invention, through said predefined incremental backup criteria, one of ordinary skill would appreciate that while the file-system object metadata for the file-system object (selected in Step 360) remains unchanged between backup operations, the content or data respective to the file-system object (selected in Step 360) does change between backup operations. Changes in content, between backup operations, after all, may be captured through an incremental backup operation, rather than a full backup operation, in order to reduce time and backup storage space consumed by the backup operation. Meanwhile, having an unchanging or static file-system object metadata, between backup operations, may disclose the nature of the file-system object(s) associated with the given VSS writer, as said metadata descriptive of the file-system object(s) rarely (if ever) change less the given VSS writer (i.e., workload) undergo upgrades or downgrades. From here, the method proceeds to Step 390 (see e.g., FIG. 3E).

Figure 3E:
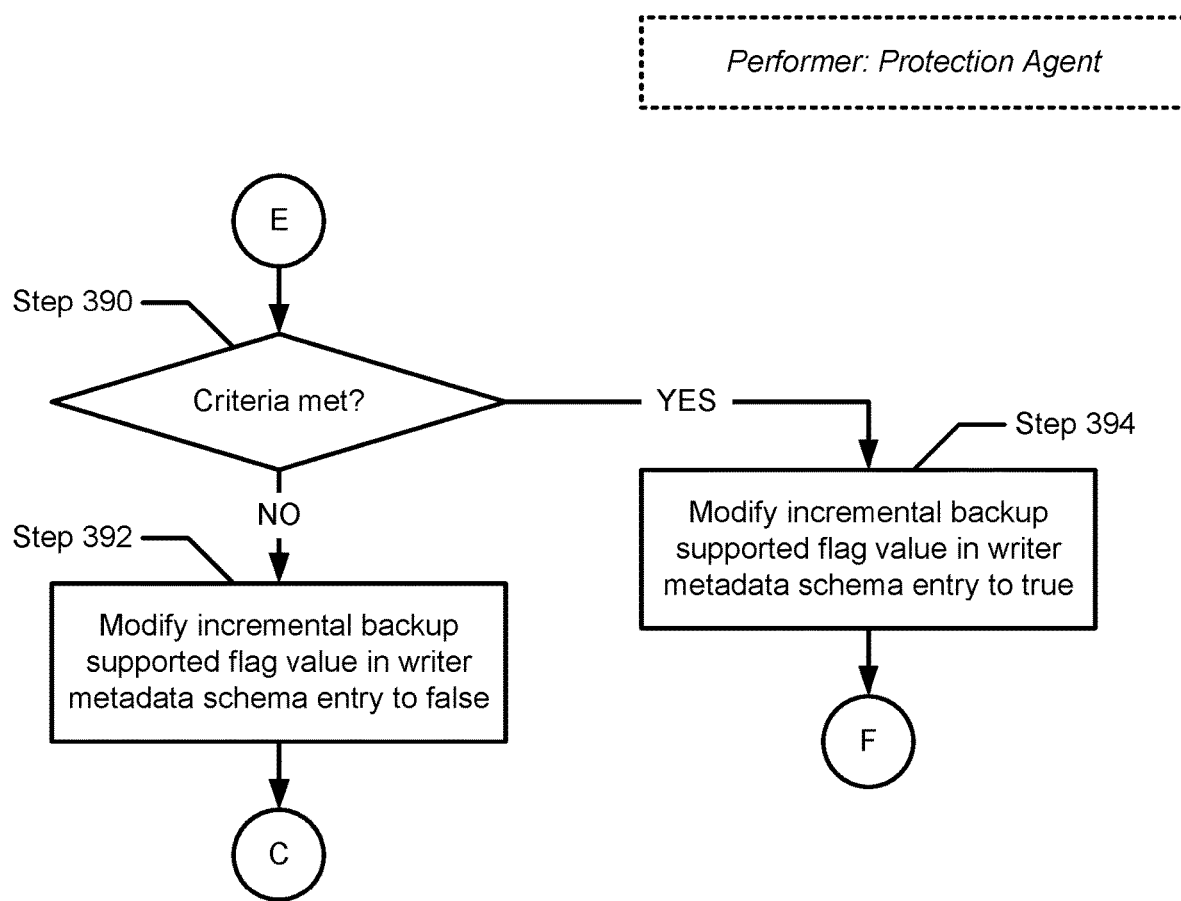

Turning to FIG. 3E, in Step 390, following the set of comparisons (performed in Step 380) against a predefined incremental backup criteria, a determination is made as to whether the predefined incremental backup criteria had been met based on the set of comparisons. In one or many embodiment(s) of the invention, if it is determined that the set of comparisons fail to meet the predefined incremental backup criteria (i.e., the file-system object hash and the past file-system object hash differ, and the file-system object checksum and the past file-system object checksum either matches or differs), then the method proceeds to Step 392. On the other hand, in one or many other embodiment(s) of the invention, if it is alternatively determined that the set of comparisons meet the predefined incremental backup criteria (i.e., the file-system object hash and the past file-system object hash match, however, the file-system object checksum and the past file-system object checksum differ), then the method alternatively proceeds to Step 394.

In Step 392, following the determination (made in Step 390) that the set of comparisons (performed in Step 380) fail to meet the above-mentioned predefined incremental backup criteria, the incremental backup supported flag state/value (obtained in Step 340) is modified. Specifically, in one or many embodiment(s) of the invention, the incremental backup supported flag state/value may be modified from a null state/value to a false state/value, thereby indicating that the given VSS writer is unsuitable to support incremental backup operations. Hereinafter, the method proceeds to Step 314 (see e.g., FIG. 3A).

In Step 394, following the alternative determination (made in Step 390) that the set of comparisons (performed in Step 380) meet the above-mentioned predefined incremental backup criteria, the incremental backup supported flag state/value (obtained in Step 340) is modified. Specifically, in one or many embodiment(s) of the invention, the incremental backup supported flag state/value may be modified from a null state/value to a true state/value, thereby indicating that the given VSS writer is suitable to support incremental backup operations. Hereinafter, the method proceeds to Step 352 (see e.g., FIG. 3C).

Figure 4A:
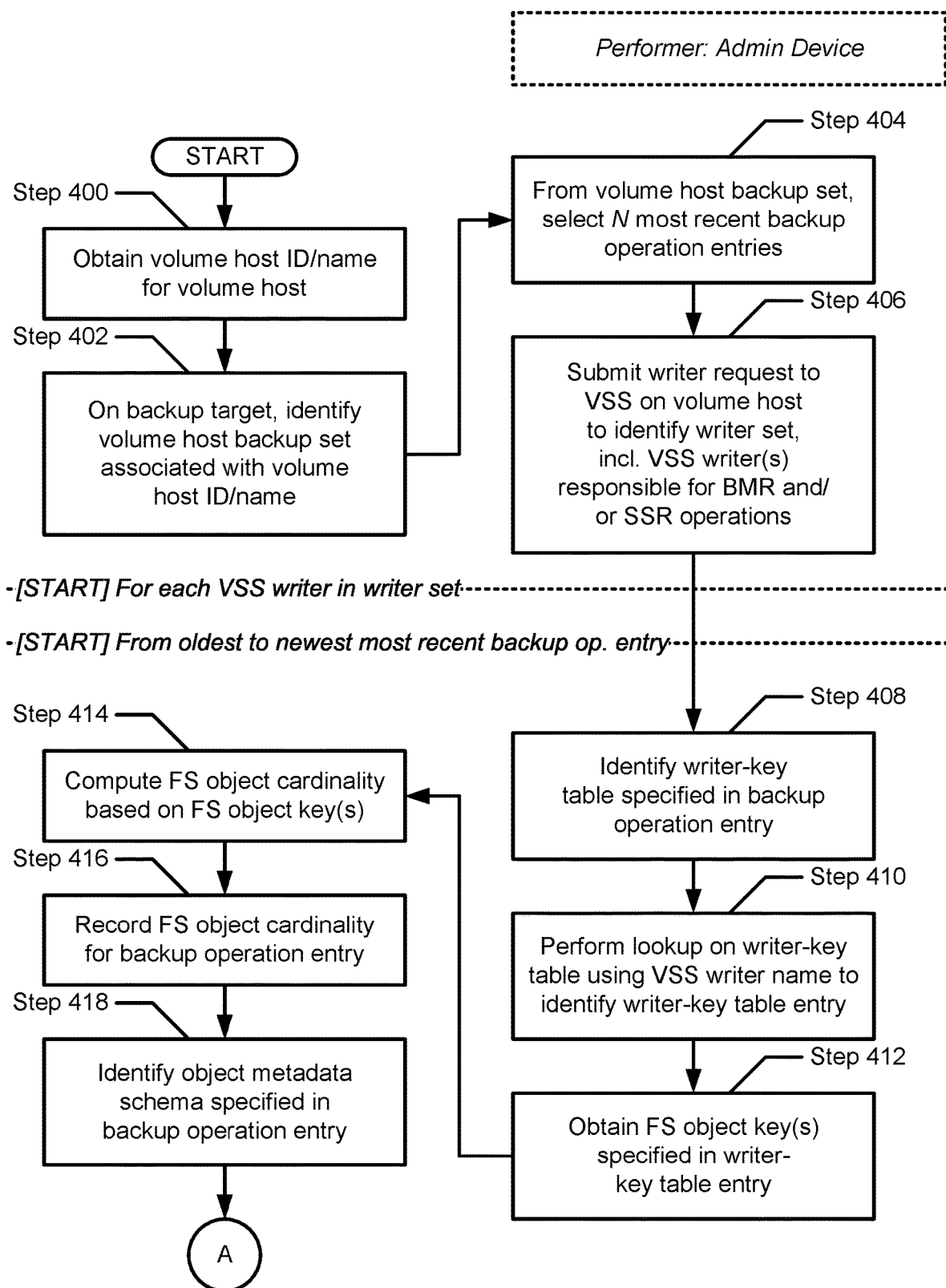
FIGS. 4A-4C show a flowchart describing a method for workload anomaly detection for standalone hosts based on bare-metal recovery and system-state recovery data and metadata in accordance with one or more embodiments of the invention.
Figure 4B:
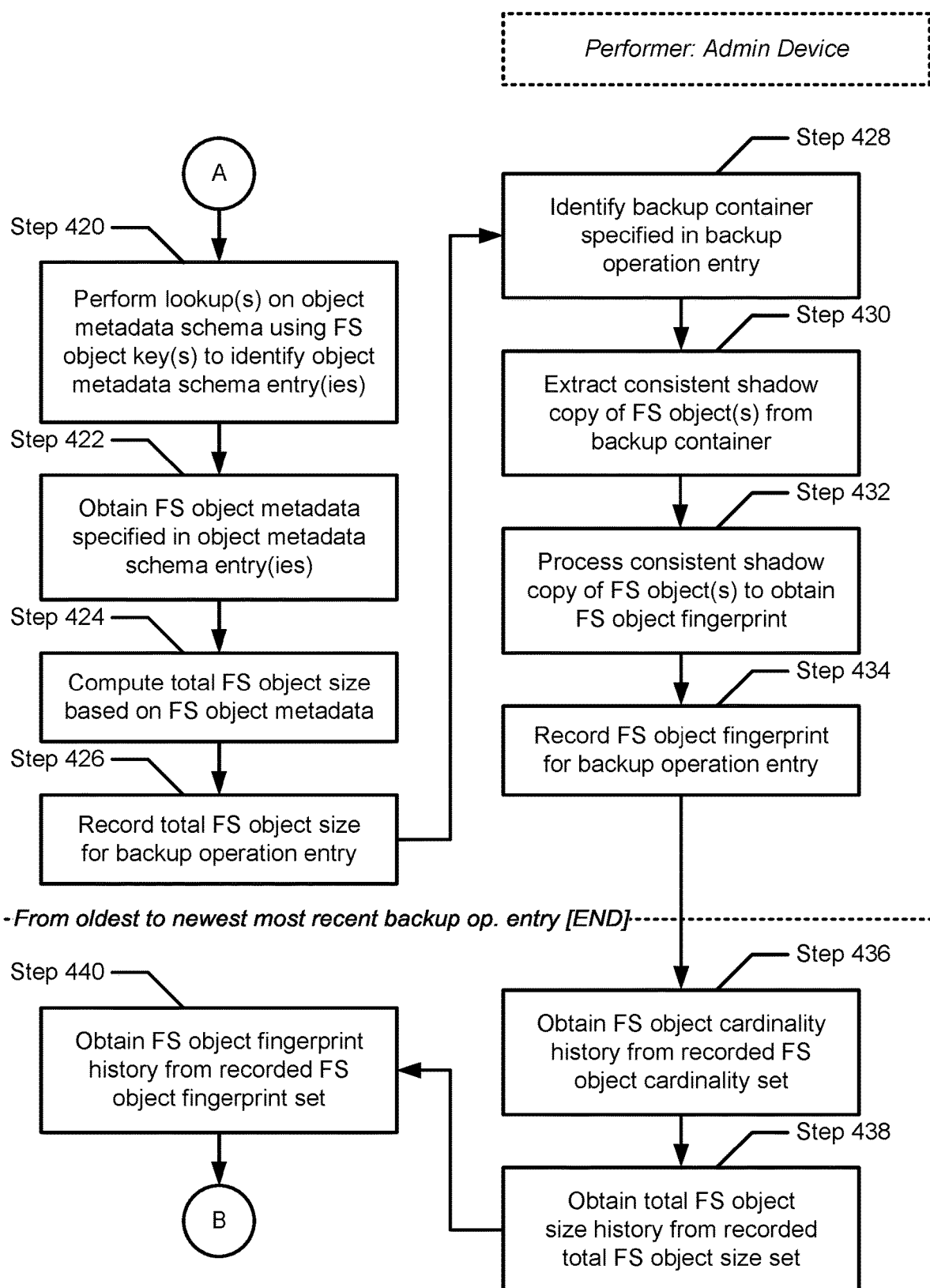
Figure 4C:
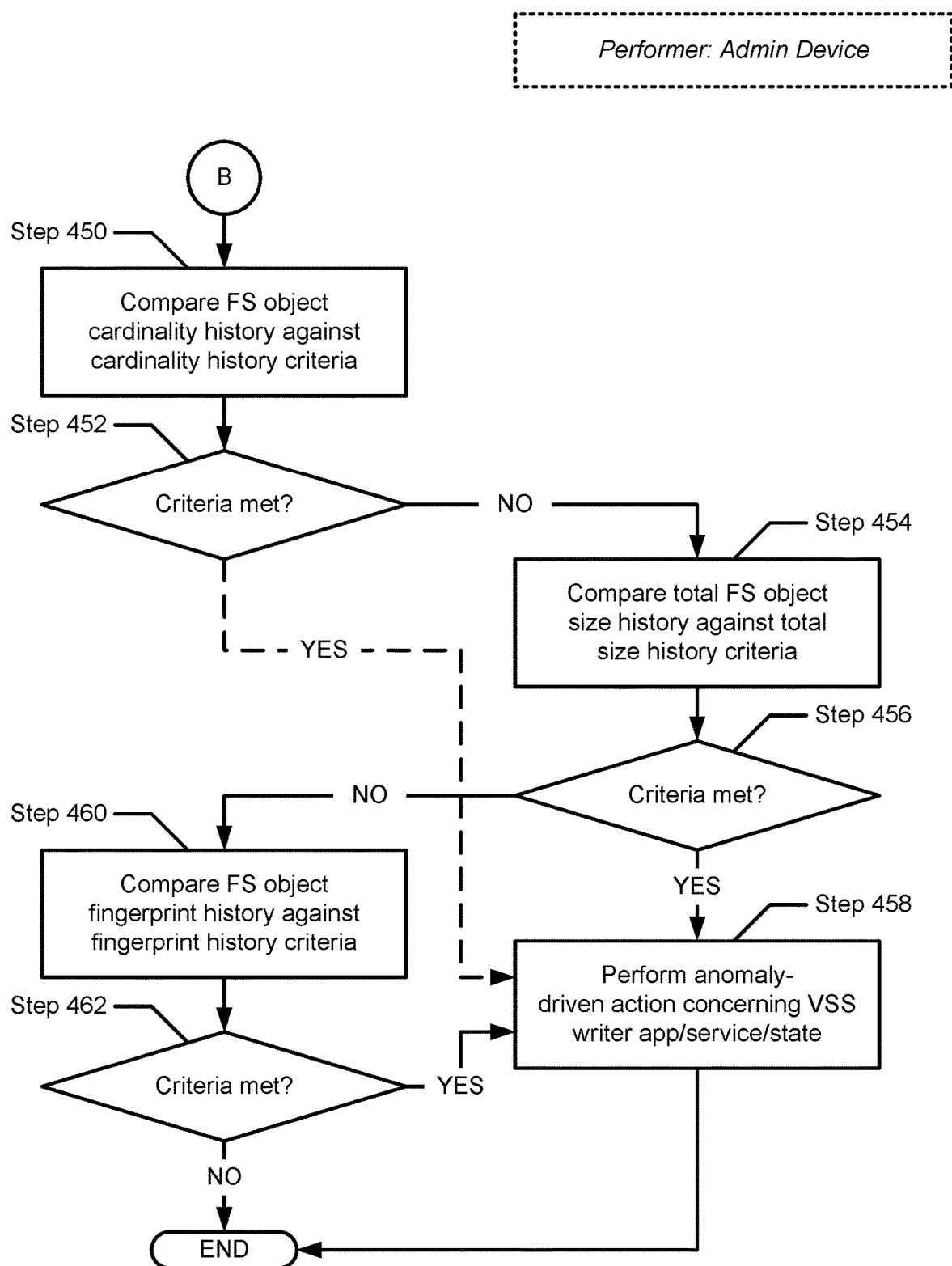

FIGS. 4A-4C show a flowchart describing a method for workload anomaly detection for standalone hosts based on bare-metal recovery and system-state recovery data and metadata in accordance with one or more embodiments of the invention. The various steps outlined below may be performed by an admin device (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, a volume host identifier (ID) or name, for a volume host, is obtained. In one or many embodiment(s) of the invention, the volume host may represent one of any number of volume hosts operating within one or many enterprise information technology (IT) environment(s) belonging to an organization. Selection of the volume host, and thus, obtaining of the volume host ID/name associated therewith, may be performed randomly or sequentially following an on-demand or scheduled periodic cyber-security inspection.

In Step 402, on a backup target, a volume host backup set (see e.g., FIG. 1C), is identified. In one or many embodiment(s) of the invention, the volume host backup set may be associated with the volume host and, accordingly, may include or specify the volume host ID/name (obtained in Step 400). The volume host backup set may further include or specify a set of backup operation entries—each respective to a previously triggered and completed backup operation targeting data and/or metadata on the volume host.

In Step 404, from the volume host backup set (identified in Step 402), a subset of backup operation entries is/are selected. In one or many embodiment(s) of the invention, the subset of backup operation entries may each map to a previous backup operation targeting data and/or metadata on the volume host, where the previous backup operation may represent one of the most chronologically recent backup operations that had been triggered and completed. Further, a cardinality of (or number of backup operation entries in) the subset of backup operations may reflect a variable opted by an administrator of the enterprise IT environment(s).

In Step 406, a writer request is submitted to a volume shadow copy service (VSS) (described above) (see e.g., FIG. 1B), which may be operating on the volume host. In one or many embodiment(s) of the invention, in response to the writer request, a writer set may be identified and provided by the VSS. The writer set may refer to a list that discloses one or many VSS writer(s) (i.e., workload(s)—e.g., operating system(s), software application(s), utility (utilities), service(s), etc.) which may be pertinent to bare-metal recovery and/or system-state recovery operations on the volume host.

Hereinafter, the remaining steps (i.e., Steps 408 to 462) may be performed, iteratively as a whole, for each VSS writer in the writer set (identified in Step 406). For example, a first iteration of the indicated remaining steps may be performed with respect to a first VSS writer specified in the writer set; thereafter, a second iteration of the indicated remaining steps may be performed with respect to a second VS S writer (if any) specified in the writer set; and so forth, including a last iteration of the indicated remaining steps that may be performed with respect to a last VSS writer (if any) specified in the writer set. Throughout any given iteration of the indicated remaining steps, the VS S writer, respective to the given iteration, may be termed hereinafter as the given VSS writer.

Further, hereinafter, a subset of the remaining steps (i.e., Steps 408 to 434) may be performed, iteratively as a whole, for each backup operation entry (selected in Step 404), from an oldest triggered/completed backup operation to a newest triggered/completed backup operation. In one or many embodiment(s) of the invention, said chronologically ascending order in which the subset of backup operation entries may be processed, may be facilitated through a backup timestamp (see e.g., FIG. 1C) specified in each backup operation entry. Accordingly, by way of an example, a first iteration of the indicated remaining steps subset may be performed with respect to the backup operation entry relative to an oldest or least newest triggered/completed backup operation; thereafter, a second iteration of the indicated remaining steps subset may be performed with respect to the backup operation entry relative to a second oldest triggered/completed backup operation (if any); and so forth, including a last iteration of the indicated remaining steps subset that may be performed with respect to the backup operation entry relative to a least oldest or the newest triggered/completed backup operation (if any). Throughout any given iteration of the indicated remaining steps subset, the backup operation entry, respective to the given iteration, may be termed hereinafter as the given backup operation entry.

In Step 408, a writer-key table (see e.g., FIG. 2C), included or specified in the given backup operation entry, is identified.

In Step 410, a lookup is performed on the writer-key table (identified in Step 408) using a VSS writer name associated with the given VSS writer. In one or many embodiment(s) of the invention, the VSS writer name may have been obtained from a list of VSS writer names disclosed in the writer set (identified in Step 406). Further, the lookup may result in the identification of an existing writer-key table entry, where the existing writer-key table entry at least includes or specifies the VS S writer name.

In Step 412, a set of file-system object keys, included or specified in the writer-key table entry (identified in Step 410), is obtained. In one or many embodiment(s) of the invention, each file-system object key may uniquely reference a file-system object associated with the given VSS writer, which had been protected per the previous backup operation respective to the given backup operation entry. Further, by way of an example, each file-system object key may reference a backup container record index assigned to a file-system object. The backup container record index may indicate a sequential record number, for a record within the backup container (see e.g., FIG. 1C), mapped at least to the file-system object.

In Step 414, a file-system object cardinality is computed based on the set of file-system object keys (obtained in Step 412). In one or many embodiment(s) of the invention, the file-system object cardinality may refer to a numerical value that reflects a quantity of file-system object(s) associated with the given VSS writer. Accordingly, as the set of file-system object keys includes a file-system object key for each file-system object associated with the given VSS writer, the file-system object cardinality may logically be derived therefrom through a counting of the file-system object key(s).

In Step 416, the file-system object cardinality (computed in Step 414), for the given VSS writer and given backup operation entry combination, is recorded.

In Step 418, an object metadata schema (see e.g., FIG. 2B), included or specified in the given backup operation entry, is identified. From here, the method proceeds to Step 420 (see e.g., FIG. 4B).

Turning to FIG. 4B, in Step 420, a lookup is performed on the object metadata schema (identified in Step 418) using each file-system object key in the set of file-system object keys (obtained in Step 412). In one or many embodiment(s) of the invention, each lookup may result in the identification of an object metadata schema entry, where the identified object metadata schema entry at least includes or specifies a respective file-system object key used in the lookup.

In Step 422, from a set of object metadata schema entries (i.e., including an object metadata schema entry (identified in Step 420) as a result of each performed lookup), file-system object metadata, included or specified in each of the set of object metadata schema entries, is obtained.

In Step 424, a total file-system object size is computed. In one or many embodiment(s) of the invention, the total file-system object size may be computed based on at least a portion of the file-system object metadata (obtained in Step 422), which may include combined information descriptive of the set of file-system objects associated with the given VSS writer. More specifically, computation of the total file-system object size may be facilitated through the summation of a storage size, disclosed in the file-system object metadata, for each of the file-system object(s) associated with given VSS writer. Accordingly, the total file-system object size may reflect a combined storage size (e.g., in bytes) consumed by the set of file-system objects.

In Step 426, the total file-system object size (computed in Step 424), for the given VSS writer and given backup operation entry combination, is recorded.

In Step 428, a backup container (see e.g., FIG. 1C), included or specified in the given backup operation entry, is identified.

In Step 430, from the backup container (identified in Step 428), a consistent shadow copy for the set of file-system objects, or for each file-system object in the set of file-system objects, associated with the given VSS writer, is extracted. In one or many embodiment(s) of the invention, based on whether the backup operation respective to the given backup operation entry had exercised a full backup operation or an incremental backup operation, the extracted consistent shadow copy (copies) may each reflect a full consistent shadow copy (i.e., including all data respective to the VSS writer maintained on the volume host) or an incremental consistent shadow copy (i.e., including only change(s) to data respective to the VSS writer maintained on the volume host, where the change(s) may have been performed since an immediately previous backup operation relative to the backup operation).

In Step 432, the consistent shadow copy (copies) (extracted in Step 430) is/are subsequently processed. In one or many embodiment(s) of the invention, processing of the consistent shadow copy (copies) may entail the generation, and thus may result in the attainment, of a file-system object fingerprint for the content (i.e., data) of each file-system object in the set of file-system objects associated with the given VSS writer. Generation of any file-system object fingerprint may involve the application of any existing hash function onto an arbitrary-sized character string (i.e., the content or data of a file-system object stored in or inferred from the consistent shadow copy (copies)), thereby producing a fixed-sized bit array representative of the file-system object fingerprint.

In Step 434, the file-system object fingerprint(s) (obtained in Step 432), for the given VSS writer and given backup operation entry combination, is recorded.

In Step 436, a file-system object cardinality history is obtained. In one or many embodiment(s) of the invention, the file-system object cardinality history may refer to a time-series that reflects a set of file-system object cardinalities (i.e., including a file-system object cardinality (recorded in Step 416) for each backup operation entry in the set of backup operation entries (selected in Step 404)) presented in a chronologically ascending order.

In Step 438, a total file-system object size history is obtained. In one or many embodiment(s) of the invention, the total file-system object size history may refer to a time-series that reflects a set of total file-system object sizes (i.e., including a total file-system object size (recorded in Step 426) for each backup operation entry in the set of backup operation entries (selected in Step 404)) presented in a chronologically ascending order.

In Step 440, a file-system object fingerprint history, for each file-system object associated with the given VSS writer, is obtained. In one or many embodiment(s) of the invention, the file-system object fingerprint history, for any file-system object, may refer to a time-series that reflects a set of file-system object fingerprints (i.e., including a file-system object fingerprint (recorded in Step 424) for each combination of the file-system object and a backup operation entry in the set of backup operation entries (selected in Step 404)) presented in a chronologically ascending order. From here, the method proceeds to Step 450 (see e.g., FIG. 4C).

Turning to FIG. 4C, in Step 450, the file-system object cardinality history (obtained in Step 436) is compared against a predefined cardinality history criteria. In one or many embodiment(s) of the invention, the predefined cardinality history criteria may outline conditions for determining whether the given VSS writer, at least in part, exhibits anomalous behavior; and, henceforth, states that, for the given VSS writer to, at least in part, exhibit said anomalous behavior, the file-system object cardinality history, for the given VSS writer, should indicate a sudden increase, or alternatively, a sudden decrease, in a cardinality (or number) of file-system object(s) protected through chronologically ascending backup operations targeting data and/or metadata respective to the given VSS writer maintained on the volume host.

In Step 452, a determination is made as to whether the predefined cardinality history criteria (mentioned in Step 450) had been met based on the performed comparison there-against using the file-system object cardinality history (obtained in Step 436). In one or many embodiment(s) of the invention, if it is determined that the file-system object cardinality history fails to meet the predefined cardinality history criteria, then the method proceeds to Step 454. On the other hand, in one or many other embodiment(s) of the invention, if it is alternatively determined that the file-system object cardinality history meets the predefined cardinality history criteria, then the method alternatively proceeds to Step 458.

In Step 454, following the determination (made in Step 452) that the file-system object cardinality history (obtained in Step 436) fails to meet the predefined cardinality history criteria (mentioned in Step 450), the total file-system object size history (obtained in Step 438) is compared against a predefined total size history criteria. In one or many embodiment(s) of the invention, the predefined total size history criteria may outline conditions for determining whether the given VSS writer, at least in part, exhibits anomalous behavior; and, henceforth, states that, for the given VSS writer to, at least in part, exhibit said anomalous behavior, the total file-system object size history, for the given VSS writer, should indicate a sudden increase, or alternatively, a sudden decrease, in a total storage space size consumed by the file-system object(s) protected through chronologically ascending backup operations targeting data and/or metadata respective to the given VSS writer maintained on the volume host.

In Step 456, a determination is made as to whether the predefined total size history criteria (mentioned in Step 454) had been met based on the performed comparison there-against using the total file-system object size history (obtained in Step 438). In one or many embodiment(s) of the invention, if it is determined that the total file-system object size history meets the predefined total size history criteria, then the method proceeds to Step 458. On the other hand, in one or many other embodiment(s) of the invention, if it is alternatively determined that the total file-system object size history fails to meet the predefined total size history criteria, then the method alternatively proceeds to Step 460.

In Step 458, following the alternative determination (made in Step 452) that the file-system object cardinality history (obtained in Step 436) fails to meet the predefined cardinality history criteria (mentioned in Step 450), or following the determination (made in Step 456) that the total file-system object size history (obtained in Step 438) meets the predefined total size history criteria (mentioned in Step 454), or following the determination (made in Step 462) (described below) that the file-system object fingerprint history (obtained in Step 440) meets the predefined fingerprint history criteria (mentioned in Step 460) (described below), one or many anomaly-driven action(s) is/are performed. In one or many embodiment(s) of the invention, each performed anomaly-driven action may concern or involve the given VSS writer (i.e., a workload operating on the volume host) and/or data (and/or metadata) pertaining to the given VSS writer. Furthermore, the anomaly-driven action(s) may be triggered as a result of, or in response to, a suspicion or confirmation that the given VSS writer may be exhibiting anomalous behavior. Examples of an anomaly-driven action may include, but may not be limited to, marking at least one consistent shadow copy of the given VSS writer as suspect, where the at least one consistent shadow copy is/are associated with file-system object metadata responsible for the file-system object cardinality history meeting the predefined cardinality history criteria, for the total file-system object size history meeting the predefined total size history criteria, and/or for the file-system object fingerprint history meeting the predefined fingerprint history criteria; generating at least one critical alert notification; and purging the aforementioned at least one consistent shadow copy of the given VSS writer.

In Step 460, following the alternative determination (made in Step 456) that the total file-system object size history (obtained in Step 438) fails to meet the predefined total size history criteria (mentioned in Step 454), the file-system object fingerprint history (obtained in Step 440) is compared against a predefined fingerprint history criteria. In one or many embodiment(s) of the invention, the predefined fingerprint history criteria may outline conditions for determining whether the given VSS writer, at least in part, exhibits anomalous behavior; and, henceforth, states that, for the given VSS writer to, at least in part, exhibit said anomalous behavior, the file-system object fingerprint history, for the given VSS writer, should, at least in part, reflect or include at least one suspicious pattern amongst the file-system object(s) protected through chronologically ascending backup operations targeting data and/or metadata respective to the given VSS writer maintained on the volume host. Further, the at least one suspicious pattern may pertain to, and may thus uniquely identify, at least one known cyber-security threat or attack, respectively. Identification of the any suspicious pattern(s) may entail the application of any existing procedure(s) or algorithm(s) (e.g., signature analysis via pattern matching) for anomaly and/or intrusion detection.

In Step 462, a determination is made as to whether the predefined fingerprint history criteria (mentioned in Step 460) had been met based on the performed comparison there-against using the file-system object fingerprint history (obtained in Step 440). In one or many embodiment(s) of the invention, if it is determined that the file-system object fingerprint history meets the predefined fingerprint history criteria, then the method proceeds to Step 458. On the other hand, in one or many other embodiment(s) of the invention, if it is alternatively determined that the file-system object fingerprint history fails to meet the predefined fingerprint history criteria, then the method alternatively ends. It may be concluded that the given VSS writer does not exhibit any anomalous behavior based on neither the predefined cardinality history criteria (mentioned in Step 450) being met, nor the predefined total size history criteria (mentioned in Step 454) being met, and further, nor the predefined fingerprint history criteria (mentioned in Step 460) being met. One or more additional, and/or alternative, history criteria may be used without departing from the scope of the invention.

Figure 5A:
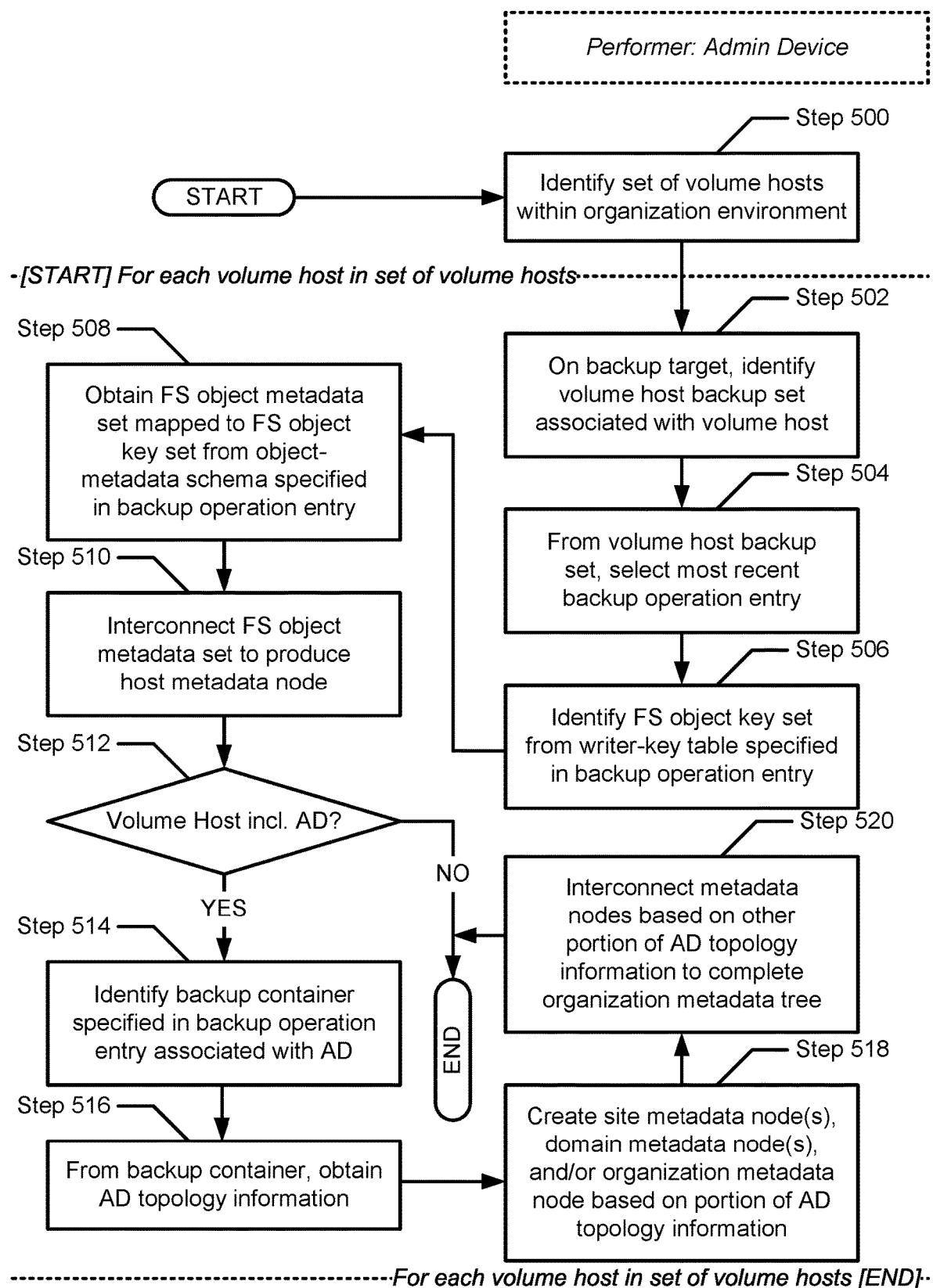
FIG. 5A shows a flowchart describing a method for generating a topological view of organization information technology environments based on bare-metal recovery and system-state recovery data and metadata in accordance with one or more embodiments of the invention.

FIG. 5A shows a flowchart describing a method for generating a topological view of organization information technology environments based on bare-metal recovery and system-state recovery data and metadata in accordance with one or more embodiments of the invention. The various steps outlined below may be performed by an admin device (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, a set of volume hosts, across one or many information technology (IT) environment(s) (e.g., data center(s)) belonging to an organization, is/are identified.

Hereinafter, the remaining steps (i.e., Steps 502 to 520) may be performed, iteratively as a whole, for each volume host in the set of volume hosts (identified in Step 500). For example, a first iteration of the indicated remaining steps may be performed with respect to a first volume host specified in the set of volume hosts; thereafter, a second iteration of the indicated remaining steps may be performed with respect to a second volume host (if any) specified in the set of volume hosts; and so forth, including a last iteration of the indicated remaining steps that may be performed with respect to a last volume host (if any) specified in the set of volume hosts. Throughout any given iteration of the indicated remaining steps, the volume host, respective to the given iteration, may be termed hereinafter as the given volume host.

In Step 502, on a backup target, a volume host backup set (see e.g., FIG. 1C), is identified. In one or many embodiment(s) of the invention, the volume host backup set may be associated with the given volume host and, accordingly, may include or specify a volume host ID/name that uniquely identifies the given volume host. The volume host backup set may further include or specify a set of backup operation entries—each respective to a previously triggered and completed backup operation targeting data and/or metadata on the given volume host.

In Step 504, from the volume host backup set (identified in Step 502), a most recent backup operation entry, in the set of backup operation entries, is selected. In one or many embodiment(s) of the invention, the most recent backup operation entry may refer to the backup operation entry that at least includes or specifies a backup timestamp encoding a latest chronological date and/or time.

In Step 506, from the most recent backup operation entry (selected in Step 504), a writer-key table (see e.g., FIG. 2C) is identified. Thereafter, in one or many embodiment(s) of the invention, one or many file object key(s) at least included or specified in each existing writer-key table entry of the identified writer-key table, may be extracted therefrom to obtain a file-system object key set. The file-system object key set, accordingly, may include a file-system object key for each of any number of file-system objects that had been maintained on the given volume host and that had undergone data-loss protection by way of the most recent backup operation triggered on the given volume host.

In Step 508, from the most recent backup operation entry (selected in Step 504), an object metadata schema (see e.g., FIG. 2B) is identified. Thereafter, in one or many embodiment(s) of the invention, a respective lookup may be performed on the identified object metadata schema using each file-system object key in the file-system object key set (obtained in Step 506). The lookups the identification of at least a subset of the existing object metadata schema entries of the identified object metadata schema. Next, from each object metadata schema entry in the at least subset of existing object metadata schema entries, file-system object metadata at least included or specified therein may be obtained. Collectively, the obtained file-system object metadata, respective to each identified object metadata schema entry, may be referred herein as a file-system object metadata set.

In Step 510, a host-tier metadata node (see e.g., FIG. 2F), for the given volume host, is produced. That is, in one or many embodiment(s) of the invention, the file-system object metadata set (obtained in Step 508) are interconnected in a hierarchical manner (i.e., resembling a file-system). The resulting interconnected file-system object metadata set may subsequently be mapped to or associated with a host-tier metadata node (see e.g., FIG. 2F) that, at least in part, constructs an organization metadata tree.

In Step 512, a determination is made as to whether the given volume host includes an active directory (AD). An active directory may refer to a service (e.g., a computer program), which may execute on the underlying hardware of a volume host, that organizes, locates, and manages network resources (e.g., volumes, file-system objects, computing systems, users, etc.) across the IT environment(s), or at least one or many portion(s) thereof, belonging to an organization. In one or many embodiment(s) of the invention, if it is determined that an active directory is operating on the given volume host, then the method proceeds to Step 512. On the other hand, in one or more other embodiment(s) of the invention, if it is alternatively determined that no active directory is operating on the given volume host, then the method alternatively ends (at least for the iteration of the above-indicated remaining steps for the given volume host).

In Step 514, following the determination (made in Step 512) that an active directory is operating on the given volume host, a backup container is identified. Specifically, in one or many embodiment(s) of the invention, from the most recent backup operation entry (selected in Step 504), a set of backup containers at least included or specified therein may be identified. Further, of the identified set of backup containers, the backup container, respective to the active directory service operating on the given volume host, may be selected.

In Step 516, from the backup container (identified in Step 514), a consistent shadow copy, relative to the active directory service operating on the given volume host, is obtained. Further, in one or many embodiment(s) of the invention, active directory topology information, stored in the obtained consistent shadow copy, may be extracted therefrom. The active directory topology information may include, but may not be limited to, information that may assemble network resources into logical groupings and, further, connect or link said logical groupings in a hierarchical manner (see e.g., FIG. 2F).

In Step 518, any number of non-leaf metadata nodes are subsequently created based on at least a portion of the active directory topology information (extracted in Step 516). In one or many embodiment(s) of the invention, the at least portion of the active directory topology information, pertinent herein, may include information describing the logical groupings of network resources within at least a portion of an organization that may be organized, located, and managed by the active directory service operating on the given volume host. Furthermore, the created non-leaf metadata node(s) may include site-tier metadata node(s), domain-tier metadata node(s), and/or the organization-tier metadata node (see e.g., FIG. 2F). Moreover, each created non-leaf metadata node may be mapped to or associated with an aggregation of file-system object metadata commensurate and respective to their classification of metadata node.

In Step 520, metadata nodes, including the host-tier metadata node (produced in Step 510) and the non-leaf metadata node(s) (created in Step 518), are interconnected to further construct (or complete) an organization metadata tree (see e.g., FIG. 2F). In one or many embodiment(s) of the invention, the metadata nodes may be interconnected based on at least another portion of the active directory topology information (extracted in Step 516). The at least other portion of the active directory topology information, pertinent herein, may include information describing the relationship between or linking amongst the logical groupings of network resources within at least a portion of an organization that may be organized, located, and managed by the active directory service operating on the given volume host.

Figure 5B:
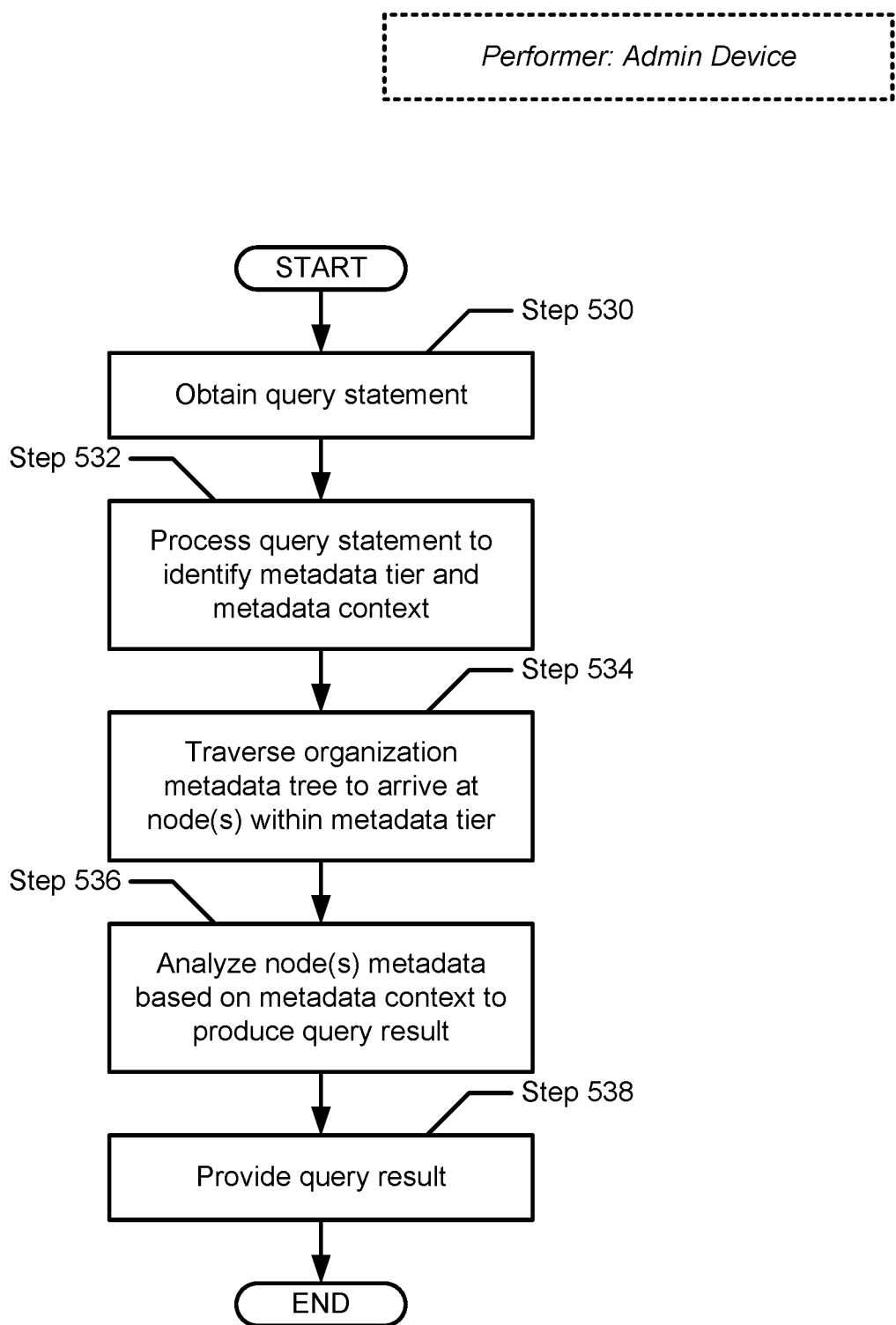
FIG. 5B shows a flowchart describing a method for processing query statements through traversal of an organization metadata tree in accordance with one or more embodiments of the invention.

FIG. 5B shows a flowchart describing a method for processing query statements through traversal of an organization metadata tree in accordance with one or more embodiments of the invention. The various steps outlined below may be performed by an admin device (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 5B, in Step 530, a query statement is obtained. In one or many embodiment(s) of the invention, the query statement may refer to a vocal or written sentence that may express or identify a query sought by an administrator (or administrators) of the information technology (IT) environment(s) belonging to an organization. The sought query, and thus the query statement, may pertain to a metadata context, which may include, but may not be limited to: workload (e.g., software application, operating system, utility, service, etc.) installation, distribution, and usage across any granularity of the organization; and metrics describing data (e.g., file-system object) generation, usage, etc. also across any granularity of the organization. The metadata context of any sought query is not limited to the aforementioned specific examples. Furthermore, the sought query, and thus the query statement, may also pertain to a metadata tier, which may reference any logical tier (see e.g., FIG. 2F) within which an aggregation of file-system object metadata may be consolidated with respect to an organization metadata tree.

In Step 532, the query statement (obtained in Step 530) is processed to thereby identify the above-mentioned metadata tier and metadata context embedded in the query statement.

In Step 534, an organization metadata tree (see e.g., FIG. 2F) is traversed based on at least the metadata tier (identified in Step 532). In one or many embodiment(s) of the invention, traversal of the organization metadata tree may take a top-to-bottom, or alternatively, a bottom-to-top, approach. Further, in traversing the organization metadata tree, one or many metadata node(s), forming the organization metadata tree at least in part, may be identified, where the identified metadata node(s) may reside at or may be classified into the metadata tier.

In Step 536, the metadata node(s) (identified in Step 534) is/are subsequently analyzed. Particularly, in one or many embodiment(s) of the invention, an aggregation of file-system object metadata, respective to each identified metadata node, may be analyzed, separately or in combination, based on the metadata context (identified in Step 532). Said analysis (or analyses) may employ machine learning, natural language processing, artificial intelligence, heuristics (e.g., rules), and/or any other algorithms designed to sift through large data sets to generate insights relevant to the metadata context. The generated insight(s) may represent or be included in a query result.

In Step 538, the query result (produced in Step 536) is subsequently provided to the administrator(s) of the IT environment(s) belonging to an organization, whom had posed the query statement (obtained in Step 530).

Figure 6A:
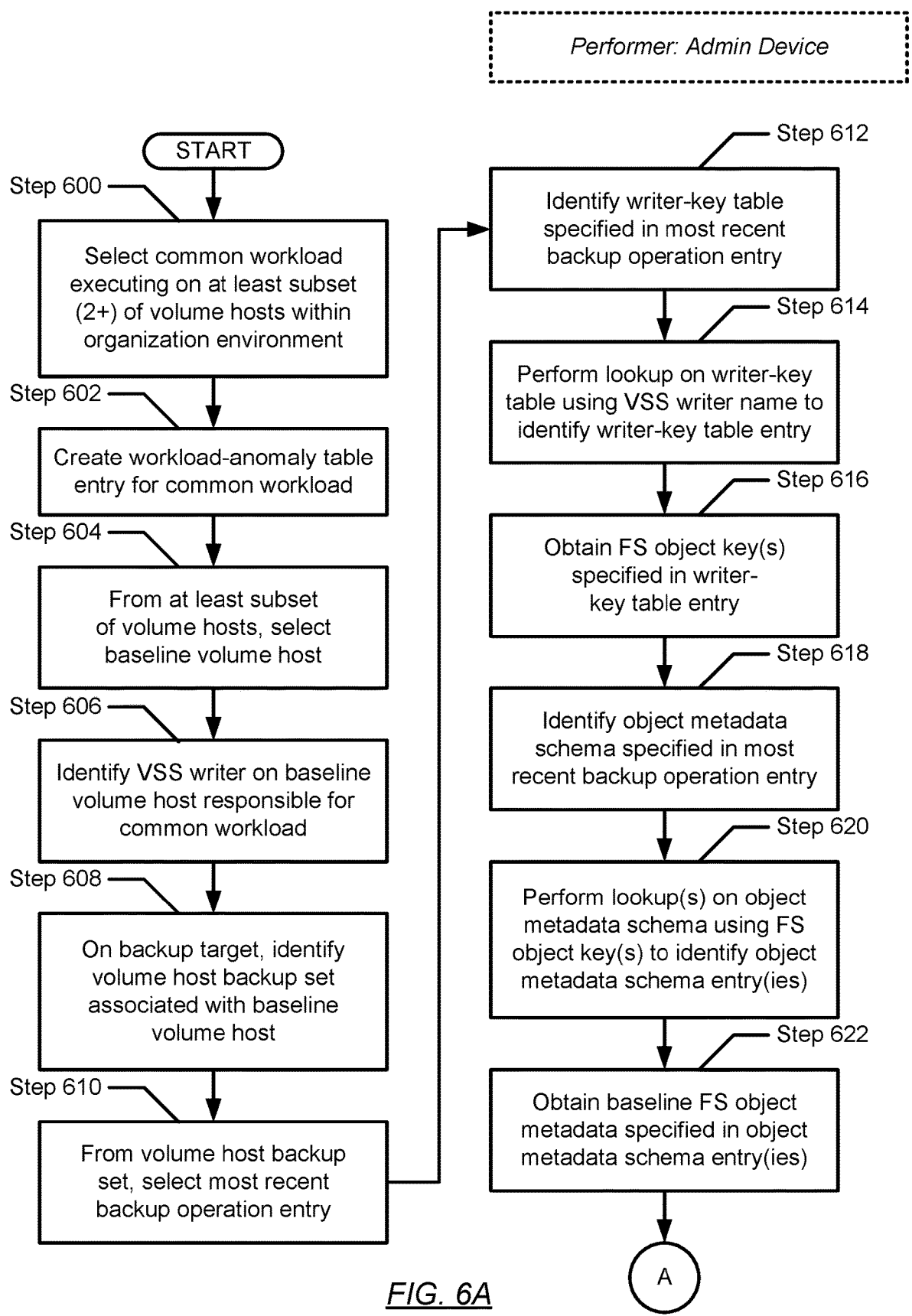
FIGS. 6A-6C show a flowchart describing a method for shared workload anomaly detection across multiple hosts based on bare-metal recovery and system-state recovery data and metadata in accordance with one or more embodiments of the invention.
Figure 6B:
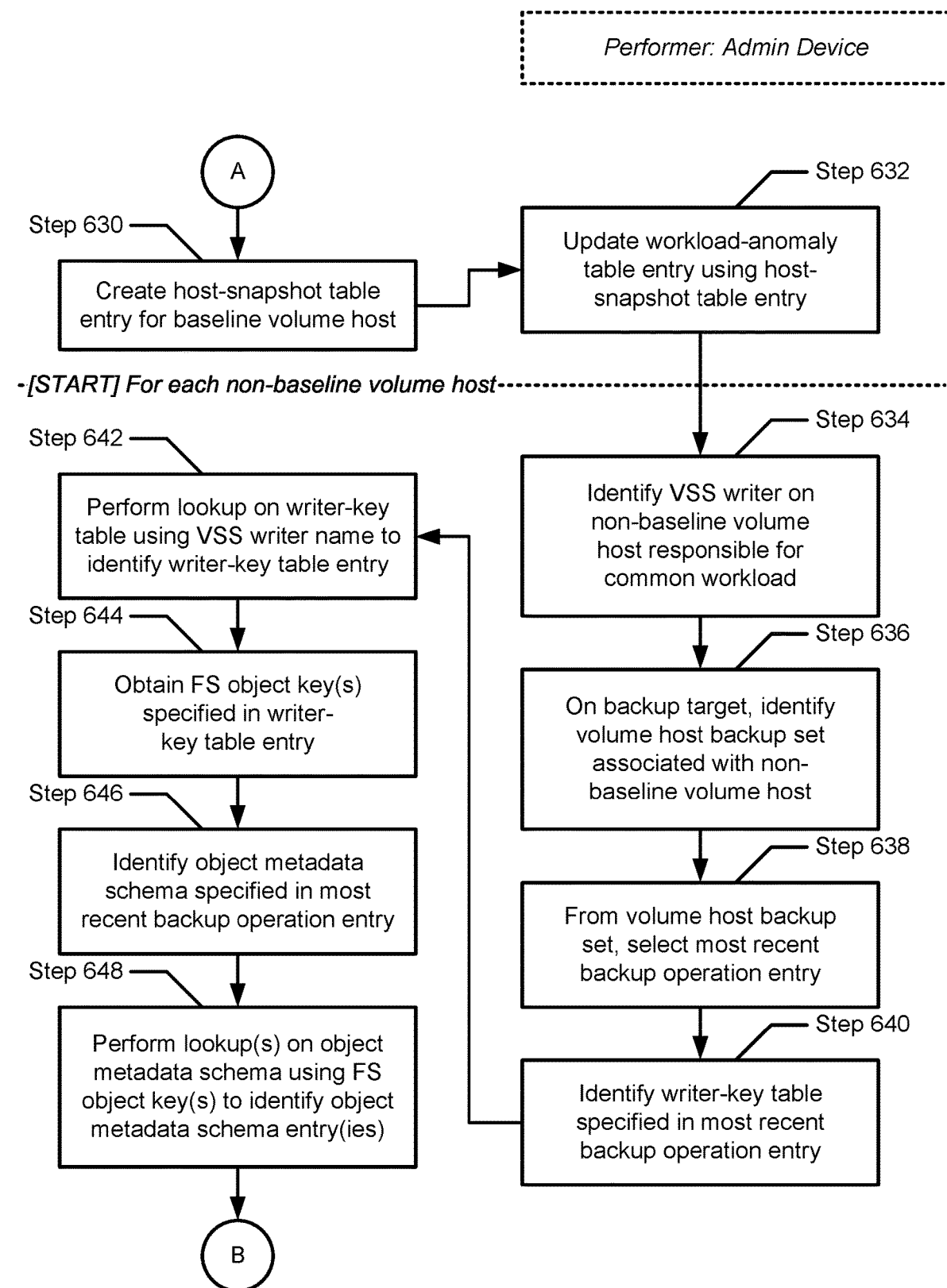
Figure 6C:
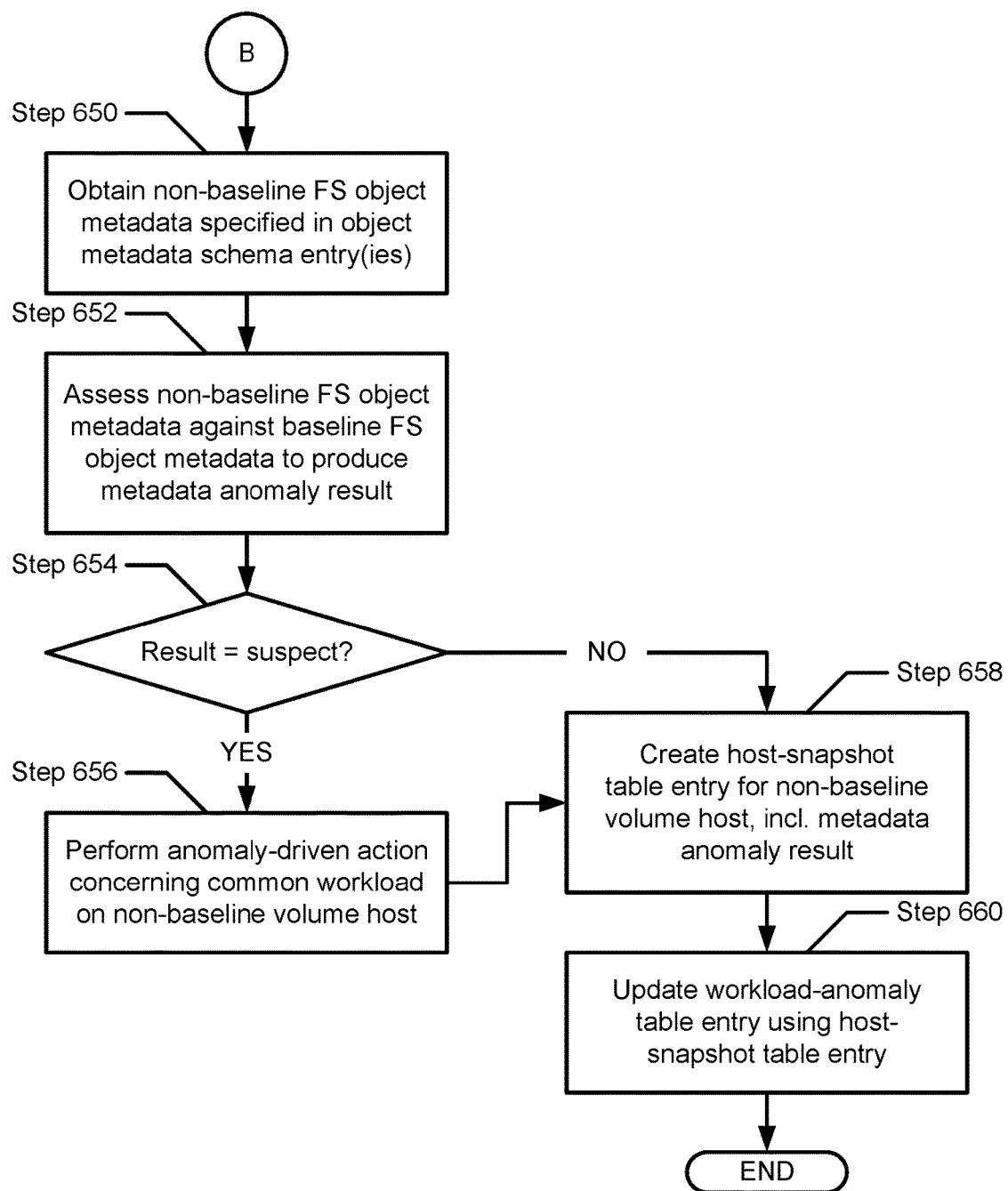

FIGS. 6A-6C show a flowchart describing a method for shared workload anomaly detection across multiple hosts based on bare-metal recovery and system-state recovery data and metadata in accordance with one or more embodiments of the invention. The various steps outlined below may be performed by an admin device (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 6A, in Step 600, a common workload (also referred herein as a shared workload) is selected. In one or many embodiment(s) of the invention, the shared workload may represent any workload (e.g., a software application, an operating system, an utility, a service, etc.) with separate instances thereof operating across at least a subset (i.e., at least two) of the volume hosts within one or many information technology (IT) environment(s) belonging to an organization.

In Step 602, a new workload-anomaly table entry (see e.g., FIG. 2E), for the shared workload (selected in Step 600), is created. In one or many embodiment(s) of the invention, the new workload-anomaly table entry may include a workload name identifying the shared workload, and an empty (i.e., entry-less) host-snapshot table used for tracking the behavior (e.g., anomalous or normal) of the shared workload instances, respectively, across the at least subset of volume hosts.

In Step 604, from the at least subset of volume hosts (mentioned in Step 600), one volume host is selected and, subsequently, designated as the baseline volume host. In one or many embodiment(s) of the invention, the baseline volume host may refer to a volume host whereon a master or golden instance of the shared workload operates. A master/golden shared workload instance may serve as an ideal behavioral reference against which the other shared workload instance(s) may be compared.

In Step 606, on the baseline volume host (selected in Step 604), a volume shadow copy service (VS S) writer, synonymous with the shared workload instance operating thereon, is identified. In one or many embodiment(s) of the invention, as used herein, the term VSS writer may be used interchangeably with the term workload. Accordingly, the shared workload instance, on the baseline volume, may also be referred to as the identified VSS writer.

In Step 608, on a backup target, a volume host backup set (see e.g., FIG. 1C), is identified. In one or many embodiment(s) of the invention, the volume host backup set may be associated with the baseline volume host (selected in Step 604) and, accordingly, may include or specify a volume host ID/name that uniquely identifies the baseline volume host. The volume host backup set may further include or specify a set of backup operation entries—each respective to a previously triggered and completed backup operation targeting data and/or metadata on the baseline volume host.

In Step 610, from the volume host backup set (identified in Step 608), a most recent backup operation entry, in the set of backup operation entries, is selected. In one or many embodiment(s) of the invention, the most recent backup operation entry may refer to the backup operation entry that at least includes or specifies a backup timestamp encoding a latest chronological date and/or time.

In Step 612, from the most recent backup operation entry (selected in Step 610), a writer-key table (see e.g., FIG. 2C) is identified.

In Step 614, a lookup is performed on the writer-key table (identified in Step 612) using a VSS writer name associated with the VSS writer (identified in Step 606). In one or many embodiment(s) of the invention, the VSS writer name may uniquely identify the VSS writer. Further, the lookup may result in the identification of an existing writer-key table entry in the writer-key table, where the identified writer-key table entry at least includes or specifies the VSS writer name.

In Step 616, a set of file-system object keys, further included or specified in the writer-key table entry (identified in Step 614), is/are obtained therefrom. In one or many embodiment(s) of the invention, each file-system object key may uniquely identify and reference a file-system object (e.g., a file or a directory) associated with the VSS writer (i.e., the shared workload instance) operating on the baseline volume host (selected in Step 604).

In Step 618, from the most recent backup operation entry (selected in Step 610), an object metadata schema (see e.g., FIG. 2B) is identified.

In Step 620, a lookup is performed on the object metadata schema (identified in Step 618) using each file-system object key in the set of file-system object keys (obtained in Step 616). In one or many embodiment(s) of the invention, each lookup may result in the identification of an object metadata schema entry, where the identified object metadata schema entry at least includes or specifies a respective file-system object key used in the lookup.

In Step 622, from a set of object metadata schema entries (i.e., including an object metadata schema entry (identified in Step 620) as a result of each performed lookup), file-system object metadata, included or specified in each of the set of object metadata schema entries, is obtained. In one or many embodiment(s) of the invention, each file-system object metadata may reflect information descriptive of a respective file-system object associated with the VSS writer on the baseline volume host (selected in Step 604). Further, collectively, the obtained set of file-system object metadata, corresponding to the set of object metadata schema entries, respectively, may be referred hereinafter as the baseline file-system object metadata. From here, the method proceeds to Step 630 (see e.g., FIG. 6B).

Turning to FIG. 6B, in Step 630, a new host-snapshot table entry (see e.g., FIG. 2E), for the baseline volume host (selected in Step 604), is created. In one or many embodiment(s) of the invention, content disclosed in the new host-snapshot table entry may include, but may not be limited to: a volume host name uniquely identifying the baseline volume host; a snapshot version indicating that the shared workload instance, on the baseline volume host, represents the master or golden instance that serves as a reference for shared workload behavioral comparison purposes; a metadata validation timestamp encoding a date and/or time at or on which the file-system object metadata (obtained in Step 622) had been collected; and a metadata anomaly result reflecting a null state.

In Step 632, the workload-anomaly table (mentioned in Step 602) is updated to include or using the new host-snapshot table entry (created in Step 630).

Hereinafter, the remaining steps (i.e., Steps 634 to 660) may be performed, iteratively as a whole, for each other or non-baseline volume host in the at least subset of volume hosts (mentioned in Step 600). In one or many embodiment(s) of the invention, any non-baseline volume host may refer to a volume host whereon a non-master or non-golden instance of the shared workload operates. Further, concerning the iterative performance of the indicated remaining steps, by way of an example, a first iteration of the indicated remaining steps may be performed with respect to a first non-baseline volume host specified in the at least subset of volume hosts; thereafter, a second iteration of the indicated remaining steps may be performed with respect to a second non-baseline volume host (if any) specified in the at least subset of volume hosts; and so forth, including a last iteration of the indicated remaining steps that may be performed with respect to a last non-baseline volume host (if any) specified in the at least subset of volume hosts. Throughout any given iteration of the indicated remaining steps, the non-baseline volume host, respective to the given iteration, may be termed hereinafter as the given non-baseline volume host.

In Step 634, on the given non-baseline volume host, a VSS writer, synonymous with the shared workload instance operating thereon, is identified. In one or many embodiment(s) of the invention, as used herein, the term VSS writer may be used interchangeably with the term workload. Accordingly, the shared workload instance, on the non-baseline volume, may also be referred to as the identified VSS writer.

In Step 636, on a backup target, a volume host backup set (see e.g., FIG. 1C), is identified. In one or many embodiment(s) of the invention, the volume host backup set may be associated with the given non-baseline volume host and, accordingly, may include or specify a volume host ID/name that uniquely identifies the given non-baseline volume host. The volume host backup set may further include or specify a set of backup operation entries—each respective to a previously triggered and completed backup operation targeting data and/or metadata on the given non-baseline volume host.

In Step 638, from the volume host backup set (identified in Step 636), a most recent backup operation entry, in the set of backup operation entries, is selected. In one or many embodiment(s) of the invention, the most recent backup operation entry may refer to the backup operation entry that at least includes or specifies a backup timestamp encoding a latest chronological date and/or time.

In Step 640, from the most recent backup operation entry (selected in Step 638), a writer-key table (see e.g., FIG. 2C) is identified.

In Step 642, a lookup is performed on the writer-key table (identified in Step 640) using a VSS writer name associated with the VSS writer (identified in Step 634). In one or many embodiment(s) of the invention, the VSS writer name may uniquely identify the VSS writer. Further, the lookup may result in the identification of an existing writer-key table entry in the writer-key table, where the identified writer-key table entry at least includes or specifies the VSS writer name.

In Step 644, a set of file-system object keys, further included or specified in the writer-key table entry (identified in Step 640), is/are obtained therefrom. In one or many embodiment(s) of the invention, each file-system object key may uniquely identify and reference a file-system object (e.g., a file or a directory) associated with the VSS writer (i.e., the shared workload instance) operating on the given non-baseline volume host.

In Step 646, from the most recent backup operation entry (selected in Step 638), an object metadata schema (see e.g., FIG. 2B) is identified.

In Step 648, a lookup is performed on the object metadata schema (identified in Step 646) using each file-system object key in the set of file-system object keys (obtained in Step 644). In one or many embodiment(s) of the invention, each lookup may result in the identification of an object metadata schema entry, where the identified object metadata schema entry at least includes or specifies a respective file-system object key used in the lookup. From here, the method proceeds to Step 650 (see e.g., FIG. 6C).

Turning to FIG. 6C, in Step 650, from a set of object metadata schema entries (i.e., including an object metadata schema entry (identified in Step 648) as a result of each performed lookup), file-system object metadata, included or specified in each of the set of object metadata schema entries, is obtained. In one or many embodiment(s) of the invention, each file-system object metadata may reflect information descriptive of a respective file-system object associated with the VSS writer on the given non-baseline volume host. Further, collectively, the obtained set of file-system object metadata, corresponding to the set of object metadata schema entries, respectively, may be referred hereinafter as the given non-baseline file-system object metadata.

In Step 652, the given non-baseline file-system object metadata (obtained in Step 650) is assessed against the baseline file-system object metadata (obtained in Step 622). In one or many embodiment(s) of the invention, the assessment may entail: applying a hash function to at least a portion of the given non-baseline file-system object metadata to generate a given non-baseline file-system object metadata fingerprint; applying the hash function to the same at least portion of the baseline file-system object metadata to generate a baseline file-system object metadata fingerprint; and comparing the given non-baseline file-system object metadata fingerprint against the baseline file-system object metadata fingerprint to produce a metadata anomaly result.

In one or many embodiment(s) of the invention, the given non-baseline file-system object metadata fingerprint may represent a fixed-sized bit array serving as a digital signature that reflects the content of the at least portion of the given non-baseline file-system object metadata in a compressed manner. Similarly, the baseline file-system object fingerprint may represent a fixed-sized bit array serving as a digital signature that reflects the content of the at least portion of the baseline file-system object metadata in a compressed manner. Further, when compared, the given non-baseline file-system object metadata fingerprint may match or may mismatch the baseline file-system object metadata fingerprint.

In one or many embodiment(s) of the invention, metadata generated by any shared workload, across multiple computing systems (e.g., volume hosts), should and is thus expected to be consistent throughout. Accordingly, should the given non-baseline file-system object metadata and baseline file-system object metadata fingerprints match, then a behavior, respective to the shared workload instance operating on the given non-baseline volume host, may be found to be normal or ideal—i.e., similar to the behavior respective to the master/golden shared workload instance operating on the baseline volume host. In this case, the produced metadata anomaly result may indicate that the shared workload instance on the given non-baseline volume host is not suspicious (i.e., associated with a non-suspect state). Alternatively, should the given non-baseline file-system object metadata and baseline file-system object metadata fingerprints mismatch, then a behavior, respective to the shared workload instance operating on the given non-baseline volume host, may be found to be abnormal or anomalous—i.e., dissimilar to the behavior respective to the master/golden shared workload instance operating on the baseline volume host. Further, in this case, the produced metadata anomaly result may include that the shared workload instance on the given non-baseline volume host is suspicious (e.g., associated with a suspect state).

In Step 654, a determination is made as to whether the metadata anomaly result (produced in Step 652) reflects a suspect state. In one or many embodiment(s) of the invention, if it is determined that the metadata anomaly result does indeed reflect a suspect state, then the method proceeds to Step 656. On the other hand, in one or many other embodiment(s) of the invention, if it is alternatively determined that the metadata anomaly result instead reflects a non-suspect state, then the method alternatively proceeds to Step 658.

In Step 656, following the determination (made in Step 654) that the metadata anomaly result (produced in Step 652) reflects a suspect state, one or many anomaly-driven action(s) is/are performed. In one or many embodiment(s) of the invention, each performed anomaly-driven action may concern or involve the shared workload instance operating on the given non-baseline volume host. Examples of an anomaly-driven action may include, but may not be limited to, generating a critical alert notification that may trigger further investigation or inspection of shared workload instance operating on the given non-baseline volume host; patching or upgrading the shared workload instance operating on the given non-baseline volume host; and purging, in part or in entirety, information (e.g., data and metadata) associated with the shared workload instance operating on the given non-baseline volume host from the most recent backup operation entry (selected in Step 638). From here, the method proceeds to Step 658 (described below).

In Step 658, following the alternative determination (made in Step 654) that the metadata anomaly result (produced in Step 652) reflects a non-suspect state, or following the performance of anomaly-driven action(s) (in Step 656) directed to the shared workload instance on the given non-baseline volume host (had the metadata anomaly result reflected a suspect state), a new host-snapshot table entry (see e.g., FIG. 2E), for the given non-baseline volume host, is created. In one or many embodiment(s) of the invention, content disclosed in the new host-snapshot table entry may include, but may not be limited to: a volume host name uniquely identifying the given non-baseline volume host; a snapshot version indicating that the shared workload instance, on the given non-baseline volume host, represents a non-master or non-golden shared workload instance; a metadata validation timestamp encoding a date and/or time at or on which the assessment (performed in Step 652) had transpired; and the metadata anomaly result reflecting a suspect state or a non-suspect state (depending on the assessment (performed in Step 652)).

In Step 660, the workload-anomaly table (mentioned in Step 602) is updated to include or using the new host-snapshot table entry (created in Step 658).

Figure 7:
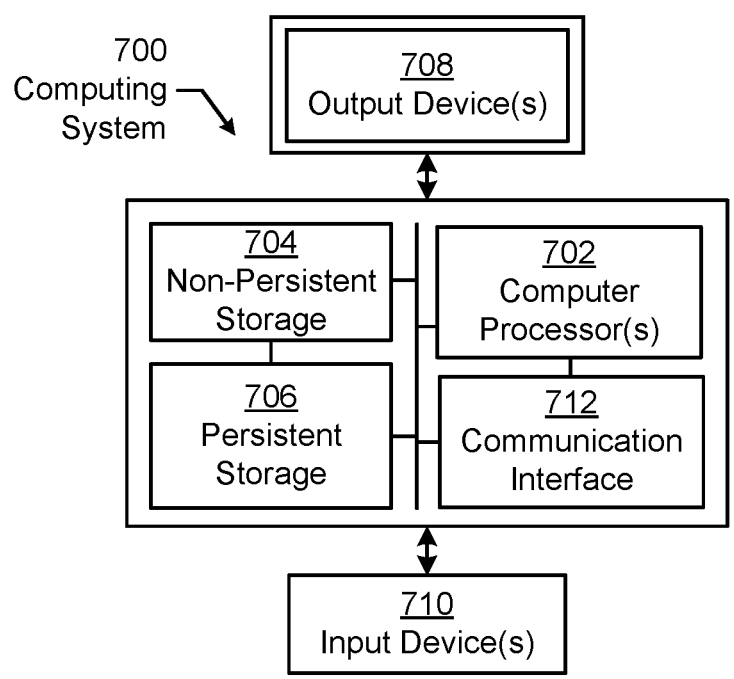
FIG. 7 shows an exemplary computing system in accordance with one or more embodiments of the invention.

FIG. 7 shows an exemplary computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for shared workload anomaly detection across multiple volume hosts, the method comprising:
   identifying a shared workload operating across a set of volume hosts;
   generating a workload-anomaly table entry for the shared workload,
      wherein the workload-anomaly table entry comprises a first identifier of the shared workload and an empty host-snapshot table that is used to track a behavior of an instance of the shared workload across the set of volume hosts;
   selecting, from the set of volume hosts, a volume host to serve as a baseline volume host;
   identifying a golden workload instance of the shared workload on the baseline volume host;
   performing a lookup on a writer-key table using a second identifier of the golden workload instance of the shared workload, wherein, in response to the lookup, a writer-key table entry that specifies the second identifier is identified in the writer-key table;
   in response to identifying the second identifier, obtaining a file-system object key from the writer-key table entry, wherein the file-system object key references a file-system object of a collection of file-system objects, wherein the file-system object is associated with the golden workload instance of the shared workload;

identifying an object metadata schema from a most recent backup operation entry, wherein, using the file-system object key, a second lookup is performed on the schema;

obtaining, in response to the second lookup and for the baseline volume host, baseline file-system object metadata descriptive of the collection of file-system objects;

selecting, from the set of volume hosts, a second volume host to serve as a non-baseline volume host;

obtaining, for the non-baseline volume host, non-baseline file-system object metadata descriptive of a second collection of file-system objects;

performing an assessment of the non-baseline file-system object metadata against the baseline file-system object metadata to produce a metadata anomaly result;

performing, based on the metadata anomaly result, an anomaly-driven action concerning the non-baseline volume host, wherein the action comprises upgrading the instance of the shared workload operating on the non-baseline volume host;

creating, based on the metadata anomaly result, a host-snapshot table entry in the host-snapshot table for the non-baseline volume host; and updating, after the creating, the workload-anomaly table entry using the host-snapshot table entry.

2. The method of claim 1, wherein the baseline volume host comprises at least the golden shared workload instance of the shared workload operating thereon.

3. The method of claim 2, wherein the collection of file-system objects are associated with the golden shared workload instance.

4. The method of claim 1, wherein the non-baseline volume host comprises a non-golden shared workload instance of the shared workload operating thereon.

5. The method of 4, wherein the second collection of file-system objects are associated with the non-golden shared workload instance.

6. The method of claim 1, wherein to perform the assessment, the method further comprises:
generating a baseline file-system object metadata fingerprint from at least a portion of the baseline file-system object metadata;
generating a non-baseline file-system object metadata fingerprint from at least a portion of the non-baseline file-system object metadata; and
making a determination that the non-baseline file-system object metadata fingerprint mismatches the baseline file-system object metadata fingerprint.

7. The method of claim 6, wherein the metadata anomaly result reflects a suspect state based on the determination.

8. The method of claim 1, wherein the baseline file-system object metadata and the non-baseline file-system object metadata comprises file-system object metadata pertinent to at least one selected from a group of operations consisting of a bare-metal recovery operation and a system-state recovery operation.

9. The method of claim 1, the method further comprising:
selecting, from the set of volume hosts, a third volume host to serve as a second non-baseline volume host;
obtaining, for the second non-baseline volume host, second non-baseline file-system object metadata descriptive of a third collection of file-system objects;

performing a second assessment of the second non-baseline file-system object metadata against the baseline file-system object metadata to produce a second metadata anomaly result; and ceasing to perform, based on the second metadata anomaly result, a second anomaly-driven action concerning the second non-baseline volume host.

10. The method of claim 9, wherein to perform the second assessment, the method further comprises:
generating a baseline file-system object metadata fingerprint from at least a portion of the baseline file-system object metadata;
generating a non-baseline file-system object metadata fingerprint from at least a portion of the second non-baseline file-system object metadata; and
making a determination that the second non-baseline file-system object metadata fingerprint matches the baseline file-system object metadata fingerprint.

11. The method of claim 10, wherein the metadata anomaly result reflects a non-suspect state based on the determination.

12. A non-transitory computer readable medium (CRM) comprising computer readable program code, which when executed by a computer processor, enables the computer processor to perform a method for shared workload anomaly detection across multiple volume hosts, the method comprising:
identifying a shared workload operating across a set of volume hosts;
generating a workload-anomaly table entry for the shared workload,
wherein the workload-anomaly table entry comprises a first identifier of the shared workload and an empty host-snapshot table that is used to track a behavior of an instance of the shared workload across the set of volume hosts;
selecting, from the set of volume hosts, a volume host to serve as a baseline volume host;
identifying a golden workload instance of the shared workload on the baseline volume host;
performing a lookup on a writer-key table using a second identifier of the golden workload instance of the shared workload, wherein, in response to the lookup, a writer-key table entry that specifies the second identifier is identified in the writer-key table;
in response to identifying the second identifier, obtaining a file-system object key from the writer-key table entry, wherein the file-system object key references a file-system object of a collection of file-system objects, wherein the file-system object is associated with the golden workload instance of the shared workload;
identifying an object metadata schema from a most recent backup operation entry, wherein, using the file-system object key, a second lookup is performed on the schema;
obtaining, in response to the second backup and for the baseline volume host, baseline file-system object metadata descriptive of the collection of file-system objects;
selecting, from the set of volume hosts, a second volume host to serve as a non-baseline volume host;
obtaining, for the non-baseline volume host, non-baseline file-system object metadata descriptive of a second collection of file-system objects;
performing an assessment of the non-baseline file-system object metadata against the baseline file-system object metadata to produce a metadata anomaly result;

performing, based on the metadata anomaly result, an anomaly-driven action concerning the non-baseline volume host, wherein the action comprises upgrading the instance of the shared workload operating on the non-baseline volume host;

creating, based on the metadata anomaly result, a host-snapshot table entry in the host-snapshot table for the non-baseline volume host; and updating, after the creating, the workload-anomaly table entry using the host-snapshot table entry.

13. The non-transitory CRM of claim 12, wherein the baseline volume host comprises at least the golden shared workload instance of the shared workload operating thereon.

14. The non-transitory CRM of claim 13, wherein the collection of file-system objects are associated with the golden shared workload instance.

15. The non-transitory CRM of claim 12, wherein the non-baseline volume host comprises a non-golden shared workload instance of the shared workload operating thereon.

16. The non-transitory CRM of 15, wherein the second collection of file-system objects are associated with the non-golden shared workload instance.

17. The non-transitory CRM of claim 12, wherein to perform the assessment, the method further comprises:

generating a baseline file-system object metadata fingerprint from at least a portion of the baseline file-system object metadata;

generating a non-baseline file-system object metadata fingerprint from at least a portion of the non-baseline file-system object metadata; and making a determination that the non-baseline file-system object metadata fingerprint mismatches the baseline file-system object metadata fingerprint.

18. The non-transitory CRM of claim 17, wherein the metadata anomaly result reflects a suspect state based on the determination.

19. The non-transitory CRM of claim 12, wherein the baseline file-system object metadata and the non-baseline file-system object metadata comprises file-system object metadata pertinent to at least one selected from a group of operations consisting of a bare-metal recovery operation and a system-state recovery operation.

20. A system, the system comprising:

a set of volume hosts; and an admin device operatively connected to the set of volume hosts and comprising a computer processor programmed to perform a method for shared workload anomaly detection across multiple volume hosts, the method comprising:

identifying a shared workload operating across the set of volume hosts;

generating a workload-anomaly table entry for the shared workload, wherein the workload-anomaly table entry comprises a first identifier of the shared workload and an empty host-snapshot table that is used to track a behavior of an instance of the shared workload across the set of volume hosts;

selecting, from the set of volume hosts, a volume host to serve as a baseline volume host;

identifying a golden workload instance of the shared workload on the baseline volume host;

performing a lookup on a writer-key table using a second identifier of the golden workload instance of the shared workload, wherein, in response to the lookup, a writer-key table entry that specifies the second identifier is identified in the writer-key table;

in response to identifying the second identifier, obtaining a file-system object key from the writer-key table entry, wherein the file-system object key references a file-system object of a collection of file-system objects, wherein the file-system object is associated with the golden workload instance of the shared workload;

identifying an object metadata schema from a most recent backup operation entry, wherein, using the file-system object key, a second lookup is performed on the schema;

obtaining, in response to the second lookup and for the baseline volume host, baseline file-system object metadata descriptive of the collection of file-system objects;

selecting, from the set of volume hosts, a second volume host to serve as a non-baseline volume host;

obtaining, for the non-baseline volume host, non-baseline file-system object metadata descriptive of a second collection of file-system objects;

performing an assessment of the non-baseline file-system object metadata against the baseline file-system object metadata to produce a metadata anomaly result;

performing, based on the metadata anomaly result, an anomaly-driven action concerning the non-baseline volume host, wherein the action comprises upgrading the instance of the shared workload operating on the non-baseline volume host;

creating, based on the metadata anomaly result, a host-snapshot table entry in the host-snapshot table for the non-baseline volume host; and updating, after the creating, the workload-anomaly table entry using the host-snapshot table entry.

* * * * *